United States Patent
Boyer et al.

(10) Patent No.: US 12,549,566 B2
(45) Date of Patent: Feb. 10, 2026

(54) HELPER AGENT AND SYSTEM

(71) Applicant: Darktrace Holdings Limited, Cambridge (GB)

(72) Inventors: John Boyer, Cambridge (GB); Ciaran Mckey, Cambridge (GB); Connor Trimble, Cambridge (GB); James Wingar, Cambridge (GB); Holly Birch, Cambridgeshire (GB); Joseph Gardner, Cambridge (GB); Thomas Marlow, Cambridge (GB); Jake Lal, Cambridge (GB); Patrick Osbourne, Cambridge (GB); Daniel Rutter, Stotfold (GB)

(73) Assignee: Darktrace Holdings Limited, Cambridge (GB)

( * ) Notice: Subject to any disclaimer, the term of this patent is extended or adjusted under 35 U.S.C. 154(b) by 289 days.

(21) Appl. No.: 17/978,871

(22) Filed: Nov. 1, 2022

(65) Prior Publication Data
US 2023/0095415 A1  Mar. 30, 2023

Related U.S. Application Data

(63) Continuation-in-part of application No. 17/323,850, filed on May 18, 2021, which is a continuation-in-part of application No. 16/279,039, filed on Feb. 19, 2019, now Pat. No. 11,477,219.

(60) Provisional application No. 63/274,376, filed on Nov. 1, 2021, provisional application No. 63/026,446, filed on May 18, 2020, provisional application No. 62/632,623, filed on Feb. 20, 2018.

(51) Int. Cl.
H04L 9/40 (2022.01)

(52) U.S. Cl.
CPC .............................. *H04L 63/1416* (2013.01)

(58) Field of Classification Search
CPC ............. H04L 63/1416; H04L 63/1408; H04L 63/1441; H04L 41/046; G06F 21/554
See application file for complete search history.

(56) References Cited

U.S. PATENT DOCUMENTS

| | | | |
|---|---|---|---|
| 9,223,971 B1 * | 12/2015 | Bartolomie | H04L 51/212 |
| 10,268,821 B2 | 4/2019 | Stockdale | |
| 10,404,733 B1 * | 9/2019 | Shavell | H04L 63/1433 |
| 10,419,466 B2 | 9/2019 | Ferguson | |
| 10,701,093 B2 | 6/2020 | Dean | |
| 2012/0158626 A1 * | 6/2012 | Zhu | G06F 21/56 726/22 |

(Continued)

*Primary Examiner* — Robert B Leung
(74) *Attorney, Agent, or Firm* — Rutan and Tucker, LLP

(57) ABSTRACT

Aspects of the invention relate to a cyber security system that may enable an end user to communicate with a cyber security appliance to identify cyber threats across the client system. The system can include one or more host devices each having a user interface and an endpoint agent for facilitating bi-directional communication between the user and a cyber security appliance. The endpoint agent may include a communication facilitation module including a user interaction module configured to communicate with the user interface and a helper module configured to communicate with the cyber security appliance. The endpoint agent is configured to enable the bi-directional communication between the user interface and the cyber security appliance on receiving a query associated with identified unusual behavior.

19 Claims, 10 Drawing Sheets

(56) References Cited

U.S. PATENT DOCUMENTS

| | | | |
|---|---|---|---|
| 2014/0344926 A1* | 11/2014 | Cunningham | G06F 21/554 |
| | | | 726/22 |
| 2016/0301705 A1* | 10/2016 | Higbee | H04L 51/42 |
| 2017/0034185 A1* | 2/2017 | Green | H04L 63/0876 |
| 2017/0212895 A1* | 7/2017 | Ahmed | G06F 16/951 |
| 2017/0244734 A1* | 8/2017 | Kinder | H04L 63/20 |
| 2018/0255076 A1* | 9/2018 | Paine | H04L 63/1416 |
| 2019/0132273 A1* | 5/2019 | Ryan | H04L 63/1483 |
| 2019/0190947 A1* | 6/2019 | Nsouli | H04L 63/1441 |
| 2019/0319905 A1* | 10/2019 | Baggett | H04L 51/212 |
| 2020/0244673 A1 | 7/2020 | Stockdale | |
| 2021/0273958 A1 | 9/2021 | McLean | |

* cited by examiner

HELPER AGENT AND SYSTEM

RELATED APPLICATION

This non-provisional application claims priority to under 35 USC 119 and the benefit of U.S. provisional patent application titled "SECURITY TOOLS," filed Nov. 1, 2021, application No. 63/274,376, which is incorporated herein by reference in its entirety. In addition, this application claims priority to and the benefit as a continuation in part application under 35 USC 120 of U.S. non-provisional patent application titled "ENDPOINT AGENT CLIENT SENSORS (cSENSORS) AND ASSOCIATED INFRASTRUCTURES FOR EXTENDING NETWORK VISIBILITY IN AN ARTIFICIAL INTELLIGENCE (AI) THREAT DEFENSE ENVIRONMENT," filed May 18, 2021, Ser. No. 17/323,850, which claims priority to and the benefit of under 35 USC 119 of U.S. provisional patent application titled "A cyber security system using artificial intelligence," filed May 18, 2020, Ser. No. 63/026,446, and which also claimed priority to and the benefit as a continuation in part application under 35 USC 120 of U.S. non-provisional patent application titled "Endpoint agent and system," filed Feb. 19, 2019, Ser. No. 16/279,039, which claims priority to and the benefit of under 35 USC 119 of U.S. provisional patent application titled "A cyber threat defense system with various improvements," filed Feb. 20, 2018, Ser. No. 62/632,623, which are all incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the present disclosure generally relate to a cyber security and threat defense platform. More particularly, the embodiments relate to an endpoint agent that enables bi-direction communication between an end user and a cyber security system and enables detected unusual, or anomalous, behavior on a host device to be queried by the end user and/or the cyber security system.

BACKGROUND

In a cyber security environment, firewalls, endpoint security methods, and other detection and defense tools may be deployed to enforce specific policies and provide protection against certain threats on such an environment. These tools currently form an important part of an organization's cyber defense strategy, but they are insufficient in the new age of cyber threats. Similarly, these tools and strategies do not effectively protect against complex modern threats, which are liable to change over time as humans seek to circumvent existing security systems.

There is therefore a need for a sophisticated cyber security system that is able to identify potential cyber security threats, such as suspicious hyperlinks, URLs, emails and/or files, and to conduct an AI-powered analysis of the nature of the potential cyber security threat.

SUMMARY

A cyber security system can enable an end user to communicate with a cyber security appliance to identify cyber threats across the client system. The system can include one or more host devices each having a user interface and an endpoint agent for facilitating bi-directional communication between the user and a cyber security appliance. The endpoint agent may include a communication facilitation module including a user interaction module configured to communicate with the user interface and a helper module configured to communicate with the cyber security appliance. The endpoint agent is configured to enable the bi-directional communication between the user interface and the cyber security appliance on receiving a query associated with identified unusual behavior.

These and other features of the design provided herein can be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1A:
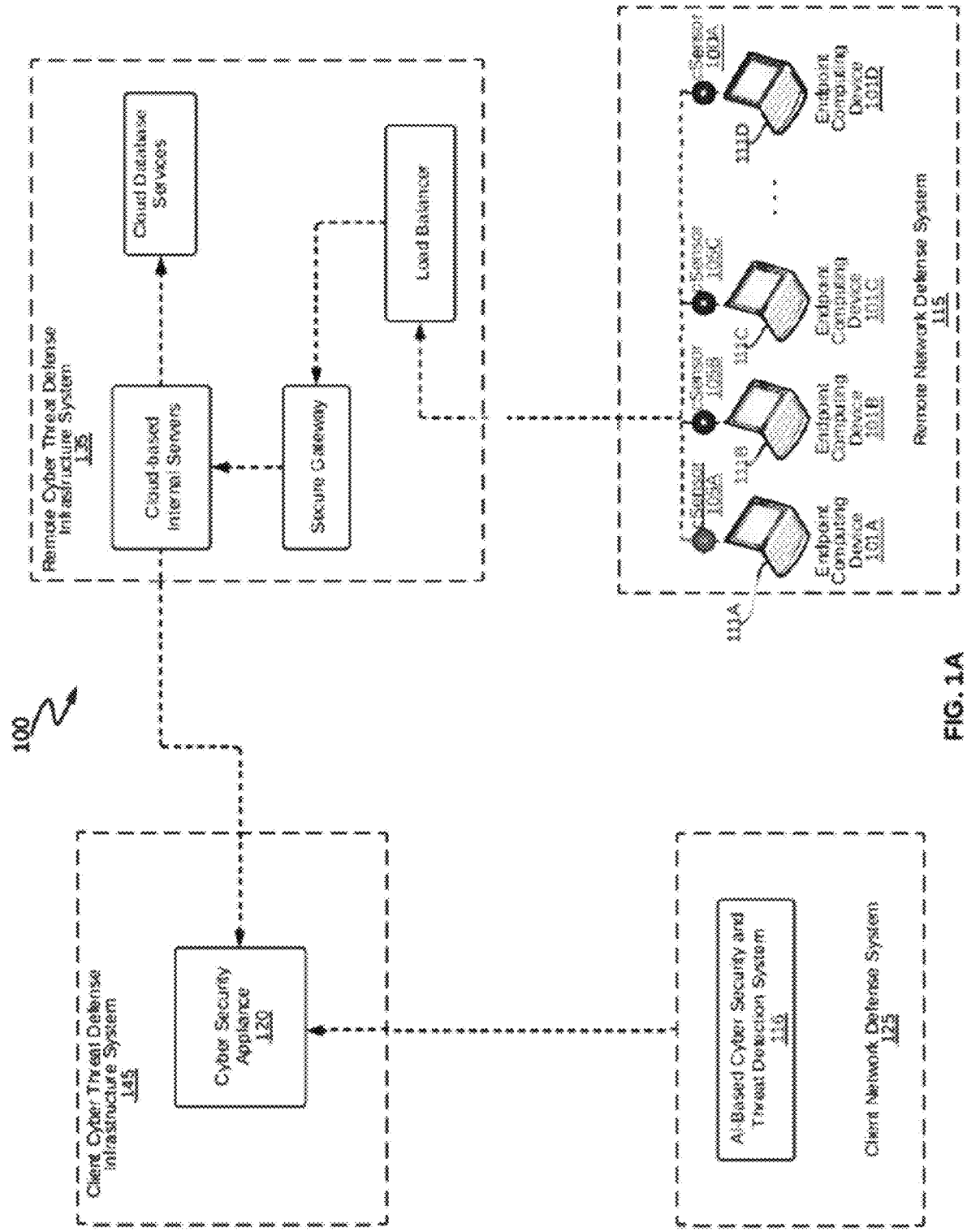
FIG. 1A illustrates an exemplary block diagram of a cyber threat detection system having a client network defense system, a remote network defense system, and one or more client/remote cyber threat infrastructure defense systems, which are configured to cooperate with each other to monitor network entities and extend visibility of those entities with a variety of endpoint agent sensors, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In general, the embodiments described herein provide a host device endpoint agent that enables bi-directional communication between an end-user and a cyber security system. Embodiments of the invention provide the advantages of enabling any user of a platform to identify cyber security threats to the platform, and to enable machine learning aspects to better improve the cyber security appliance's ability to identify or categorize unusual activity as either normal or anomalous based on historical events. This enables the process of identifying and resolving cyber security threats much quicker and more accurate even where the nature of the cyber threat may change with time.

Embodiments of the present disclosure generally relate to a host device endpoint agent. More particularly, embodiments of the present disclosure relate to a host-based "helper" endpoint agent that resides on the host device and has an icon on a display of the host device to allow regular users to initiate/flag specific emails or links/URLs for the AI based security system to check for deeper investigation by the cybersecurity platform. An application installed on device, maintained by an MDM/cSensor, may enable a user to check emails/links/messages/processes safely with a cyber security appliance. This would trigger either an investigation locally, or a request to the cyber security appliance platform to query the URL against their awareness.

The cyber security system has a wealth of information about what is considered to be a bad link, bad file, bad URL, etc. However, malicious human constantly adapt their malicious ways and links, emails, etc. The endpoint helper agent of the present disclosure allows the system to combine with the suspicions or insights of a human mind of a regular user to determine a potential suspicious link and/or URL, and/or email and to initiate a deeper analysis on what the system knows and what the system can determine about this potential malicious nature of the link and/or URL, and/or email.

The result is rather than a regular user trying to track down an IT person, tell them about their suspicion, and then the IT person using the cyber security appliance to investigate the nature of the link, email, and/or URL, in certain embodiments the regular user may merely activate the icon on their display to trigger this investigation made by the AI models of the cyber security appliance itself.

Thus, a regular person could be scanning their inbox for emails and identify an email that looks unusual but the regular user doesn't know for sure. In most cases, the regular user doesn't want to bother the IT team on each potentially suspicious email, link, or URL. However, with the endpoint helper agent, the user can, for example, right click on the link and request the cyber security appliance investigates in more detail. The endpoint helper agent collects the relevant information, and generates a request incorporating the relevant information to the cyber security appliance to check out that link, and then receive a report back on the display of the host device.

After the click of a button by the regular user, then the endpoint helper agent gathers the information relating to the suspicious or unusual behavior (e.g. an internet link) by the host device and/or the regular user as well as the command to initiate a deep investigation on this link with the AI models trained on conducting investigations on malicious cyber threats. The cyber security appliance reruns all of its AI models with this identified link as the focus of inquiry, and then generates it output classifying the nature of the identified link. Thus the concept combines artificial intelligence to conduct the investigation and quantify its nature with actual human intelligence to detect a potential link, email, and/or URL. The human intelligence aspect of the regular user filters out 90% or more of the benign links, emails, and/or URLs that would otherwise eat up the resources of the cyber security appliance if the models attempted to do a deep inspection on every email, link and URL. Instead, a portion of the CPU, memory, bandwidth, and power resources of the cyber security appliance can be working on these more likely suspicious emails, URLs, and/or links.

Thus, the host-based helper agent is configured to allow the human to initiate checks on specific emails, links, URLs, etc. while the AI models are trained on different methodologies to determine a nature of these URLs, links, and/or email and then background to draw upon all the different methodologies for retrieving this kind of intelligence and connecting the dots to putting this intelligence together.

Aspects of the above are further described below with reference to the accompanying drawings.

Referring now to FIG. 1A, an exemplary block illustration of a cyber threat detection system 100 is shown, in accordance with an embodiment of the disclosure. In the illustrated embodiments, the cyber threat detection system 100 may include a client network defense system 125, a remote network defense system 115, a client cyber threat defense infrastructure system 145, and a remote cyber threat defense infrastructure system 135. As discussed above, the illustrated cyber threat detection system 100 may implement the network defense system 115 in conjunction with the remote cyber threat defense infrastructure system 135 to cooperate with a cyber security appliance 120 in the client cyber threat defense infrastructure system 145 in order to monitor various network entities and extend visibility of such entities via a series of endpoint agents 111A-D and sensors 105A-D residing on endpoint computing devices 101A-D.

The cyber security client resident sensor (or cSensors) 105A-D and associated architecture can be configured to monitor traffic and perform intelligent functions on that traffic prior to the traffic and/or its metadata being passed onto a cyber security appliance. The illustrated cSensors 105A-D may extend the visibility of the cyber security appliance located in the network via the implemented endpoint agents 111A-D that monitors devices' network activity and delivers key data and metadata to the cyber security appliance 120. This can include remote working devices and those generally that cannot be seen adequately using bulk network traffic mirroring or other less-effective probes or sensors. These cSensors 105A-D may be ideally used in combination with other virtual sensors and deployment options to achieve a combination of greater and simpler visibility into IoT devices as well as remote workers working off line from the company network. The cSensors may also increase the amount of device identity data available in the client network system 125 and can aid device tracking in their respective user interfaces. For example, a security module of the cSensor 105A-D can have an interface to cooperate with and integrate with an operating system (OS) of the endpoint computing device. A collation module of the cSensor 105A-D can cooperate with the security module to obtain input data from the collected first set of traffic data. The additional collected information can include, for example, an identity of a computing process running in the endpoint computing device that is sending the first set of traffic data and/or receiving the first set of traffic data. As described above, the cSensors 105A-D may be an end point agent that does packet ingestion and autonomous actions on the packets being analyzed. The cSensor may be an agent installed on a client device which ingests network traffic passing to and from that device and performs some processing on that network traffic before sending it on (in packet or metadata form) as a second set of traffic data to a cyber security appliance located in a network. The network traffic can include, for example, packets from browsing, a Remote Desktop connection (RDP), encrypted SSH packets, etc. There are many variations on this process. The client sensor can ingest network traffic from any of these sources because it is resident within the endpoint device and perform deep packet inspection (DPI) on the traffic (1) to derive metadata and pass on only the metadata (i.e., "Full DPI") (e.g., HTTP traffic); (2) the client sensor can perform DPI on just parts of the connection and pass that metadata onward ("Partial DPI") (e.g., HTTPS traffic); or (3) the client sensor can process and forward all traffic to the secondary location ("No DPI") (e.g., kerberos traffic) simple mirroring of information. Which option of these three DPI actions to take for the level of DPI applied to each connection by the cSensor 105A-D is dependent on the network parameters. The network parameters to determine what predetermined level of DPI from the two or more possible levels of DPI to perform on the input data can include one or more of (i) a particular protocol being used by the first set of traffic data received or sent by the endpoint device, (ii) a proximity distance between a geographic location of the cSensor and a geographic location of the cyber security appliance, (iii) a particular size of the traffic data under analysis, and (iv) a particular degree of 'interestingness' for the traffic data under analysis in relation to the respective connection. Thus, the cSensors 105A-D may be configured to intelligently chose to pass on i) just the metadata associated with the packet traffic, ii) just a subset of the packets (e.g., packets of potential interest) and the meta data, and/or iii) pass along all of the packets to the central cyber security appliance 120 at a separate location from the cSensors 105A-D by factoring in one or more of these factors. Typically, the cSensors 105A-D factors in all four network parameters to determine what predetermined level of DPI from the two or more possible levels of DPI to perform on the input data.

In an embodiment, a secondary location may be: a) a cyber security virtual sensor (sensor) that captures VM traffic in a virtualized environment 135 located locally to the cSensors 105A-D (in the same private network or subnet) (the sensor then communicates directly with the cyber security appliance 120), b) a cloud-based secure gateway service which routes the forwarded data to the cyber security appliance 120, and/or c) an on-premises secure gateway service running on or beside a cyber security sensor. The cSensors and/or gateway service may also communicate with a third-party server managing third-party agents to receive process and traffic information ingested by the third-party agent. In one scenario, a cSensor may perform the DPI on forwarded traffic from one or more other client sensors to derive metadata which is then sent to the central cyber security appliance. This scenario may be preferable to prevent traffic passing over the network for security and bandwidth reasons. In another scenario, the cSensors and/or secure gateway service may route the forwarded metadata or connections through to the central cyber security appliance, meaning that the client does not need to create firewall exceptions for the client devices/endpoint devices hosting the endpoint agent cSensor. The gateway service may be a virtual machine, containerized service, etc. In an additional scenario, the gateway service or the V-machine can securely pass on forwarded traffic or forwarded meta data onto the central cyber security appliance and does not need to create additional firewall exceptions.

Lastly, the cSensor 105A-D may also be configured to perform autonomous actions, such as stopping certain traffic (and any other desirable actions based on the client needs, network infrastructures, and such), in response to instructions from the connected services (e.g., the sensor, the centralized master appliance 120 via the secure gateway service). The cSensors 105A-D may be implemented as the respective endpoint agents 101A-D that does packet ingestion and autonomous actions on the packets being analyzed.

Similarly, as described above, in FIG. 1B, the endpoint agent 111A with regard to the discussion of FIG. 1B depicts the one or more modules utilized by the endpoint agent hosted on an endpoint computing device 101A. In an embodiment, the endpoint agent 111A may comprise a network module configured to monitor network information coming in and going out to one or more network entities. The network module is configured to cooperate with one or more sensors to ingest a first set of traffic data transmitted via one or more connections between the network interface of the endpoint computing device and at least one or more of the network entities and sensors. A security module can have an interface to cooperate with and integrate with an operating system (OS) of the endpoint computing device. A collation module is configured to collect the ingested first set of traffic data from the network module. The collation module can obtain input data from the collected first set of traffic data. The obtained input data can include a variety of observed network events implemented by the respective network entities as well as identities of a computer process running (e.g. executable files resident) in the endpoint receiving and sending the first set of traffic currently under analysis.

An analyzer module having an intelligent deep packet inspection (DPI) engine, the analyzer module configured to receive the input data from the first set of traffic data being transmitted via the respective connection. The intelligent DPI engine is configured to perform one or more predetermined levels of DPI from its two or more possible levels of DPI on the input data based on one or more network parameters. A communication module is configured to transmit a second set of traffic data to a cyber security appliance in the network. The transmitted second set of traffic data is associated with the specified DPI performed on the input data from the first set of traffic data (e.g. DPI on all or some of the meta data and/or simple mirroring—no DPI). An autonomous action module is configured to perform one or more autonomous actions. In an embodiment, the autonomous action is in response to an autonomous response triggered by the cyber security appliance. For example, in an embodiment, the cSensor is installed on an IoT device with a limited amount of computing power. The triggered autonomous action may come from the cyber security appliance in the network which has enough processing power to recognize a potential cyber threat and a correct autonomous response to take and send the response to the cSensor resident in the IoT device. The autonomous action can be correlated to the first set of traffic data received by the endpoint device and/or the second set of traffic data received by the cyber security appliance.

In an embodiment, these predetermined levels of DPI may include a full DPI, a partial DPI, and/or a non-DPI, such that: (i) the full DPI is configured to process all packets in the first set of traffic data in order to derive all metadata associated with that first set of traffic data; (ii) the partial DPI is configured to process a portion of the packets in the first set of traffic data in order to derive a portion of the metadata associated with that first set of traffic data; and/or (iii) the non-DPI is configured to not process any of the packets in the first set of traffic data in order not to derive any of the metadata associated with that first set of traffic data but rather perform simple mirroring of incoming information from the network interface into the endpoint computing device and/or information going out from the endpoint computing device. In an embodiment, the transmitted second set of traffic data may be particularly configured to include: (i) only all of the derived metadata from the full DPI, (ii) the portion of the derived metadata in conjunction with the remaining portions of the packets from the partial DPI, and/or (iii) only all of the packets from the non-DPI.

The autonomous actions comprise at least one or more of blocking a particular connection, blocking a particular type of traffic data, preventing a particular type of activity, cooperating with the operating system to shut down one or more computer processes running on the endpoint computing device, and other similar network preventative actions. Note, the network entities can include one or more of network infrastructures, network devices, and devices/accounts associated with a specific user in one or more networks. In an embodiment, the one or more sensors comprise at least one or more of virtual sensors (vSensors), operating system sensors for a cloud environment (osSensors), security modules, and/or probes.

The network parameters can include at least one or more of: (i) a particular protocol being used by the first set of traffic data, (ii) a proximity distance between a geographic location of the cSensor and a geographic location of the cyber security appliance, (iii) a particular size of the traffic data under analysis, and (iv) a particular degree of interest for the traffic data under analysis in relation to the respective connection.

The collation module can collect network activity data from the network entities and to cooperate with a coordinator module to correlate one or more causal links between the collected network activity data from the network entities. For example, the collation module may be configured to: (i) perform passive ingestion of input data, (ii) perform potentially active collection of input data, (iii) collate connection content for any other modules in the endpoint agent cSensor and/or any other modules in any other sensors, and/or (iv) understand a plurality of characteristics of a connection event.

A security module is configured to have an interface, such as an API, driver, etc. to cooperate with and integrate with an operating system (OS) of the endpoint computing device. The security module can cooperate with the network module to assist the linking of network information with executable files/computing processes in the endpoint client device. A multi-cloud computing services modules can monitor and collect data from one or more of a Software as a Service (SaaS), an Infrastructure as a Service (IaaS), a Platform as a Service (PaaS), and/or a hybrid service. A collection module cooperating with the security module can monitor and collect specified data from multiple computing software processes executing on this endpoint device. For example, the collections and communication modules may cooperate with each other to transmit any of the observed activities to the cyber security appliance based on the specified data monitored and collected from the endpoint agent cSensor. The types of transmitted activities include at least one or more of network connection activities, data transfer activities, and/or behavior pattern activities.

A cyber threat module is configured to detect potentially unusual network activity in order to provide an additional input of information in conjunction with the transmitted specified data. For example, the cyber threat module is configured to generate a score or probability score corresponding to a level of detected potential cyber threat. Thus, the cyber threat module generates a score or probability corresponding to a level of how harmful a detected potential cyber threat is maliciously harmful to the endpoint computing device. In some endpoint devices that have a lot of memory and processing power, the endpoint agent cSensor 111A may have one or more machine learning models cooperating with the rest of the modules, such that these machine learning models are trained on a normal pattern of life of various network, behavior, and/or data activities within the network. When the memory and processing power is not available in an endpoint device, then the cyber security application can house and run the machine learning models.

Figure 1B:
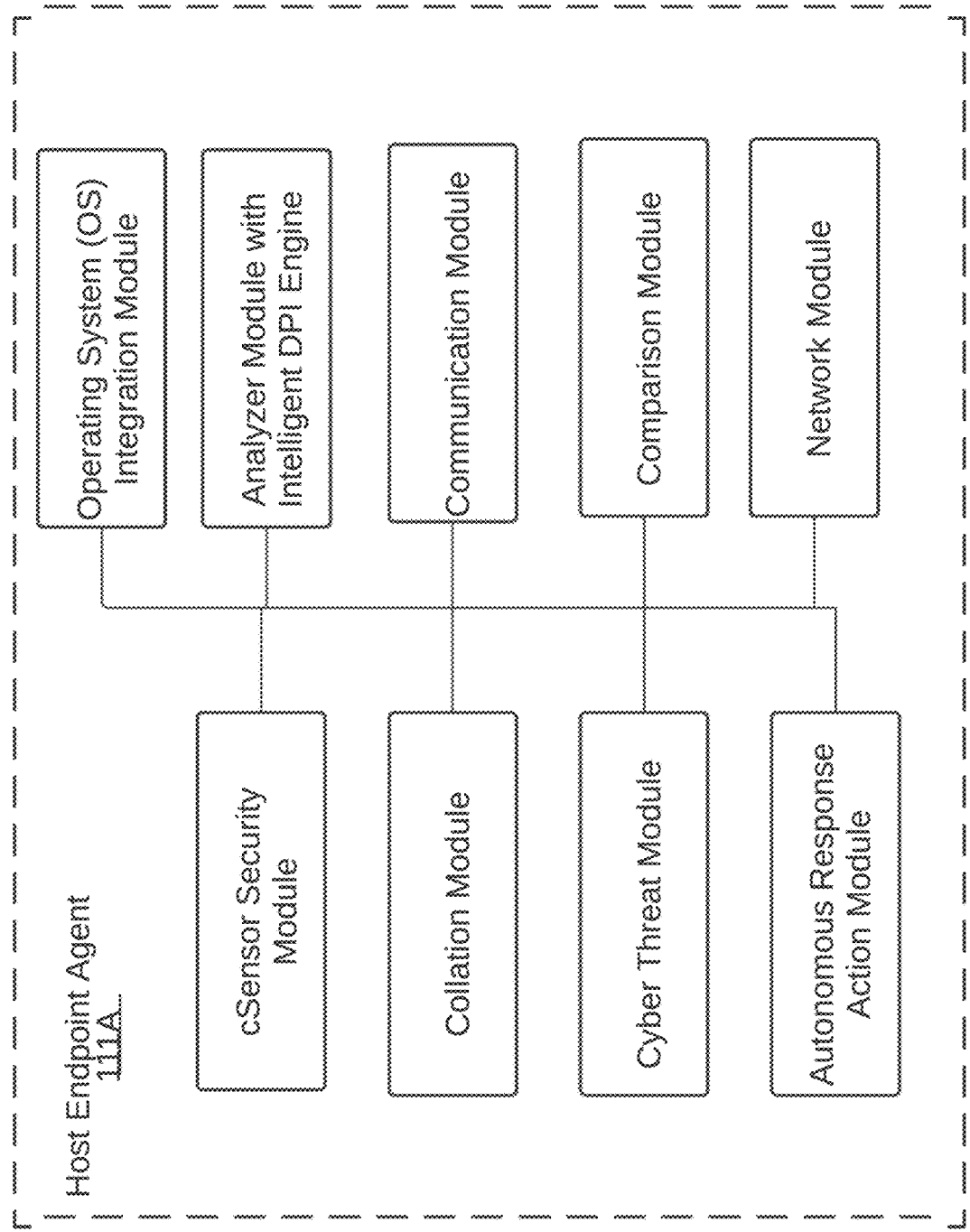
FIG. 1B illustrates an exemplary block diagram of an endpoint agent with regard to the disclosure depicted above in FIG. 1A, in accordance with an embodiment of the disclosure.

Note that any instructions of any of the modules of the endpoint agents 111A-D and cSensors 105A-D shown in FIGS. 1A-B may be scripted to be stored in an executable format in one or more memories and implemented by one or more processors of the respective endpoint computing devices.

Figure 2:
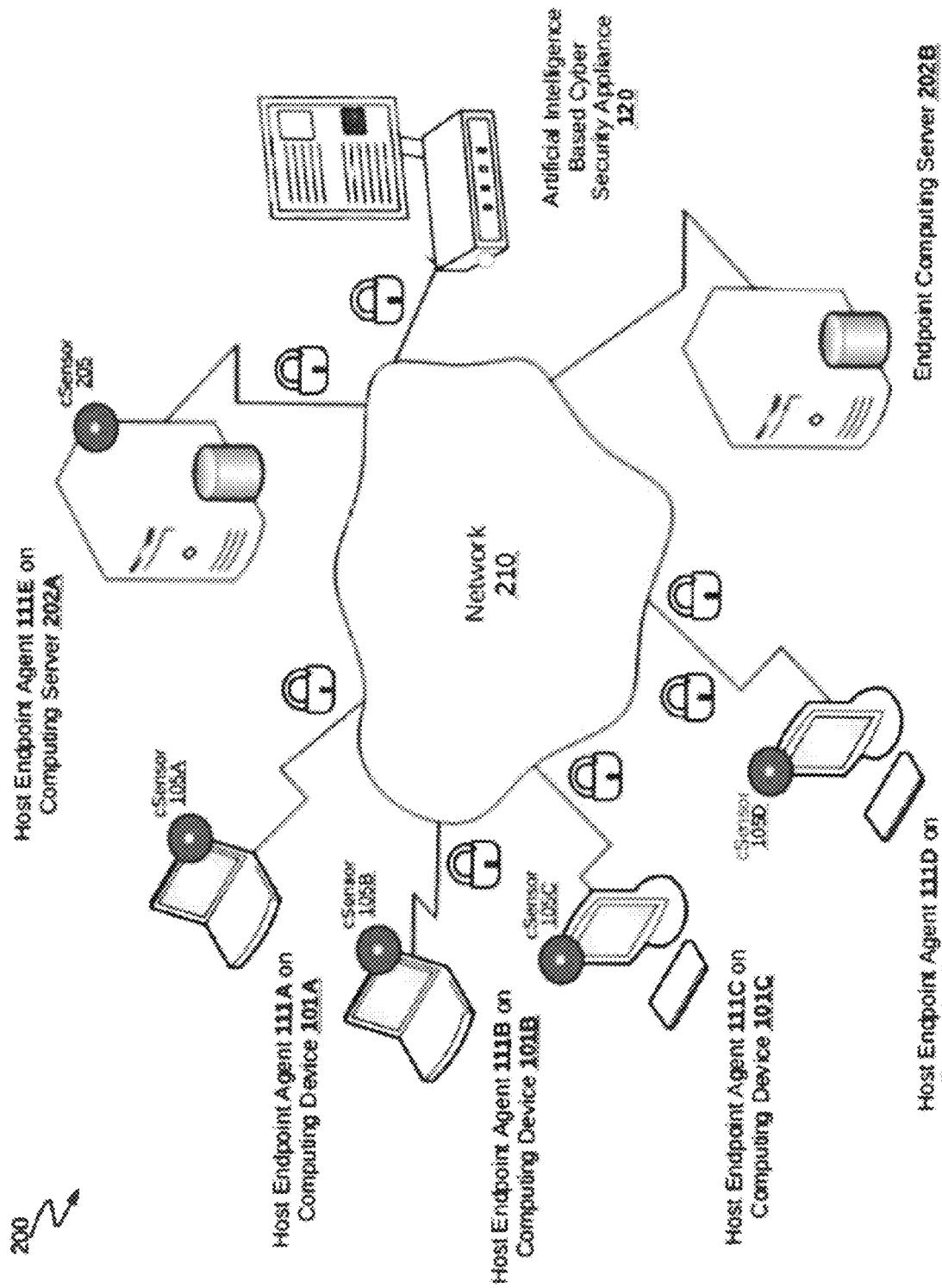
FIG. 2 illustrates an exemplary block diagram of a cyber security system having a cyber security appliance cooperating with a plurality of endpoint agents, each residing on a respective one of a plurality of endpoint computing devices, which are communicatively coupled to each other over a network, in accordance with an embodiment of the disclosure.

Referring now to FIG. 2, the AI-based cyber threat security system 200 has a cyber security appliance 120 communicatively coupled with the host endpoint agents 111A-E, endpoint agent cSensors 105A-D, endpoint computing devices 101A-D, and computing servers 202A-B over a network 210. The AI based cyber security system 200 may use the cyber security appliance 120 depicted in FIG. 2 to cooperate with the host endpoint agents 111A-E and endpoint agent cSensors 105A-D on their respective endpoint computing devices 101A-D and server 102A via the secure communication channels established with the network 110. The AI based cyber threat security system 200 depicted in FIG. 2 may be substantially similar to the cyber threat security system 100 depicted in FIG. 1A.

The cyber security appliance 120 can cooperate with the endpoint agent cSensors 105A-D residing on their respective endpoint computing devices 101A-D and server 202A to communicate, for example, receive any collected pattern of life data.

In some embodiments, the network 210 may be: (i) an information technology network, (ii) an operational technology network, (iii) a cloud infrastructure, (iv) a SaaS infrastructure, and/or (v) any combination thereof capable of being communicatively coupled to each of the respective endpoint computing devices and servers 101A-D and 202A-B. The network 210 may be used to communicatively couple the endpoint computing devices 101A-D to the endpoint computing servers 202A-B and the cyber security appliance 120. Furthermore, as shown in FIG. 2, the endpoint computing server 202A may be communicatively coupled to the network 110 via a secure channel, such as through port 443. Note, the endpoint computing server 202A with cSensor 205 can be similar to the endpoint computing server 202B, with the exception that the endpoint computing server 202B is not capable of receiving secured data from any of the other endpoint computing devices 101A-D, server 202A, and/or cyber security appliance 120 that have a cSensor.

In some embodiments, the endpoint agent cSensors 105A-D are configured to: (i) have a low system impact on the end-point computing-device and run without degrading the endpoint computing-device performance significantly; (ii) monitor the "pattern of life" of the end-point computing-device, its processes, such as Outlook, Word, etc., its users, events on that device, etc. This at least includes: (a) process behavior (use of network, filesystem, etc.), (b) relationships between processes (parent/child, shared files, IPC), and (c) user behavior (applications commonly used, IT habits); (iii) make reports on pattern of life metadata, events and alerts to an API whenever connected to the internet or LAN, and while offline, cache data to deliver when possible; (iv) assist in performing IT audits while also completing pattern of life data and events (e.g., the following list is illustrative and should not be considered exhaustive: (a) audit system details, for example installed operating systems, installed software, software versioning, security update status; (b) gather system usage activity such as shutdown periods, login failures, file modifications, network connections, etc.; and (c) record use of external devices or transfer protocols (e.g., USB usage, Bluetooth usage, email usage, etc.); and (v) autonomously react to anomalies in pattern of life: (a) cooperate with the appliance 120 with its significantly greater processing power, sets of models including, for example, pulling when available, any actions to be taken and/or be able to take a limited set of actions when a connection to the cyber defense appliance 200 is not available; (b) provide an operator with the ability to enable the end point agent to perform a select number of relatively simple actions when predefined conditions of suspicious behavior and/or anomaly level are met, independent of the cyber defense appliance; and (c) example actions may include, but are not limited to, prompt user, quarantine a suspicious process (from network access and process as well as internal computing device's process and filesystem), shutdown the offending processes, and others.

As described above, each host endpoint agent 111A-E may include an endpoint agent cSensor 105A-E configured to extend visibility and monitor network entities on their respective endpoint device/server 101A-D/202A.

Each cSensor cooperating with a host endpoint agents 101A-D on a same device may use the collections module to cooperate with two or more other sensors (or probes) that include, but are not limited to, at least: (i) a first type of probes specifically configured to collect data from an operating system of its respective endpoint computing devices/server 101A-D/202A; (ii) a second type of probes specifically configured to collect data from each individual process executing on that endpoint computing devices/server 101A-D/202A; and (iii) a third type of probe configured to collect system event and logging data from that endpoint computing devices/server 101A-D/202A. The collections module may cooperate with one or more of the third type of probes to monitor and record events occurring on those endpoint computing devices/server 101A-D/202A. The collected data from the operating system and individual processes along with the recorded events may be sent in the collected pattern of life data by the collections modules to the appliance 120.

The collections module's framework runs probes in communication with the other various modules and data stores. The first type of probes may monitor the operating system to gather profiling pattern of life data about the system state. This information may include, for example, installed applications, software versions, operating system and pending security updates. Meanwhile, the second type of probes may monitor individual processes themselves to gather process pattern of life data such as, but not limited to, associations between parent and child processes, network connectivity and process interaction, file system interaction, etc. Lastly, the third type of probe may detect and record events and collaborate with default system event logging tools. This probe may gather events such as, for example, connections to new Wi-Fi or wired networks, interaction with peripheral devices (including, but not limited to, universal serial bus, visual displays, etc.) and system usage events such as power management, file modification, etc.

As discussed, one or more models may be a self-learning model trained on a normal behavior of each of the entities in an endpoint device and/or each network entity. The self-learning model of normal behavior is then continuously updated with the actual behavior of that entity. The self-learning model of normal behavior is updated when new input data is received that is deemed within the limits of normal behavior. The modules may compare the analyzed metrics received from the probes and hooks to a moving benchmark of parameters that correspond to the normal pattern of life for the computing system used by the self-learning model. Accordingly, the cyber threat module may then determine, in accordance with the analyzed metrics and the moving benchmark used by the self-learning model of normal behavior of the entity, an anomaly score indicative of a likelihood of a harmful cyber threat and its severity.

Note, a normal behavior threshold may be used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, as described above, any of the host endpoint agents 111A-E cooperating with a cSensor 105A-E may have an autonomous action module that causes one or more autonomous actions to be taken to contain the cyber threat when detected and when: (i) that endpoint agent is not connected to the network 210 where the appliance 120 is installed, (ii) the appliance 120 is unavailable to communicate with the endpoint agent, and/or (iii) any combination of (i) and/or (ii) occur. The autonomous action module located in that endpoint agent may take one or more autonomous action actions preapproved by a human user when predefined conditions of suspicious behavior and/or anomaly level are met, independent of the appliance 120 to autonomously attempt to contain the potential cyber threat.

Again, the autonomous action module, rather than a human taking an action, may be configured to cause one or more autonomous actions to be taken to contain the cyber threat when a potential cyber threat is detected. Note, the cyber security appliance 120 may have the autonomous action module, and/or one or more portions of the autonomous action module may exist on that host endpoint agent and/or cSensor, while the majority portion may remain on the cyber security appliance 120 due to greater processing power. A user programmable interface hosted on the appliance 120 may have, any of, fields, menus, and icons that are configured to allow a user to preauthorize the autonomous action module to take actions to contain and/or respond to the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device.

The user programmable interface has the granularity in options available to the user to program the autonomous action module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Figure 3:
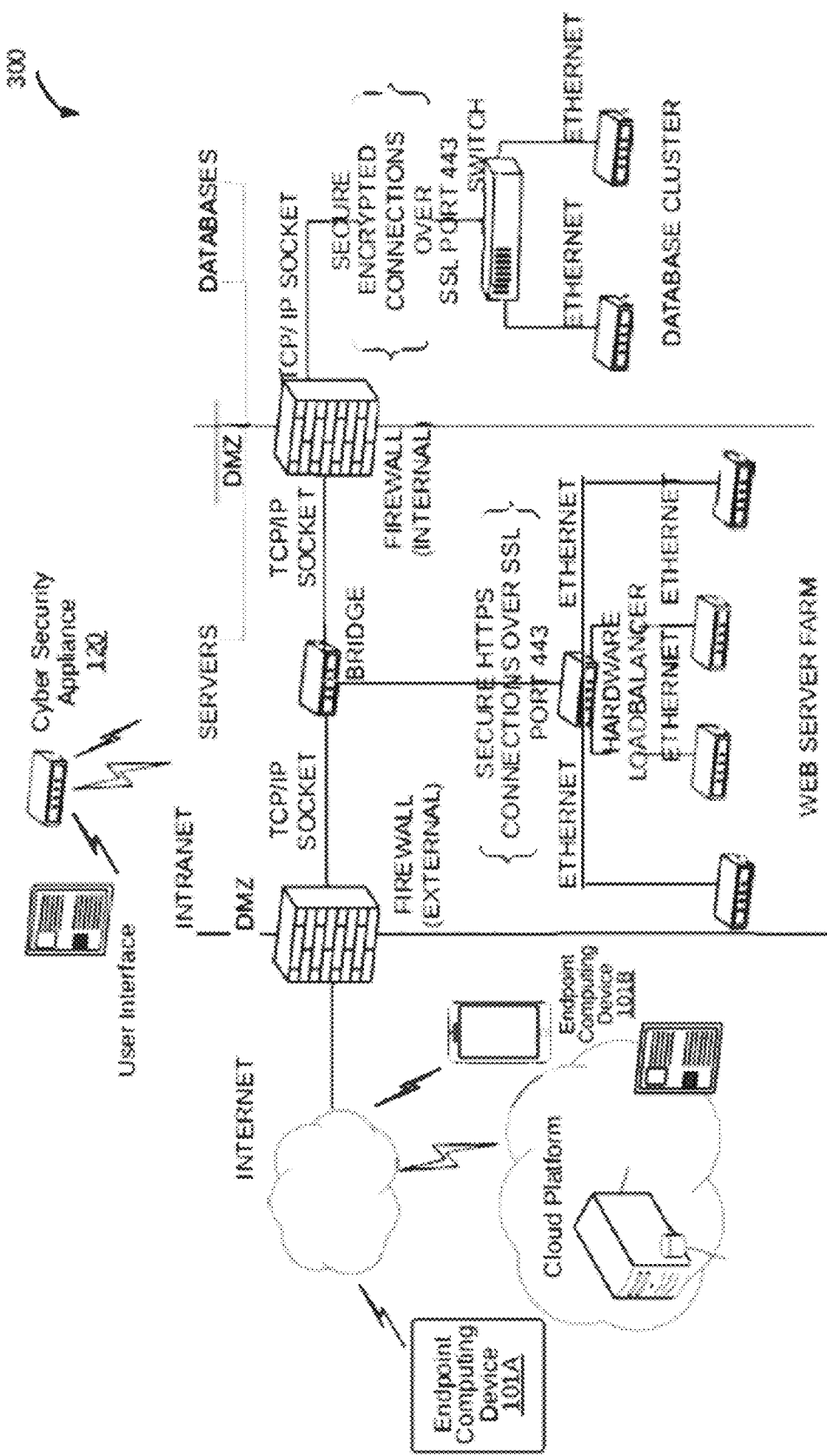
FIG. 3 illustrates a block diagram of an exemplary cyber security platform having a cyber security appliance configured to protect various network devices and endpoint devices communicatively coupled over a network, in accordance with an embodiment of the disclosure.

Referring now to FIG. 3, an AI based cyber security network environment 300 can have a cyber security appliance 120 configured to protect endpoint devices 101A-B and a variety of network devices. As shown in FIG. 3, the AI based cyber security network environment 300 may use the cyber security appliance 120 to cooperate with the host endpoint devices 101A-B and, for example, their respective endpoint agent cSensors in conjunction with the other network devices to communicate with each other in this network environment 300. The AI based cyber security network system 300 depicted in FIG. 3 may be configured similar to the cyber threat security systems 100 and 200 depicted in FIGS. 1A and 2.

Figure 4:
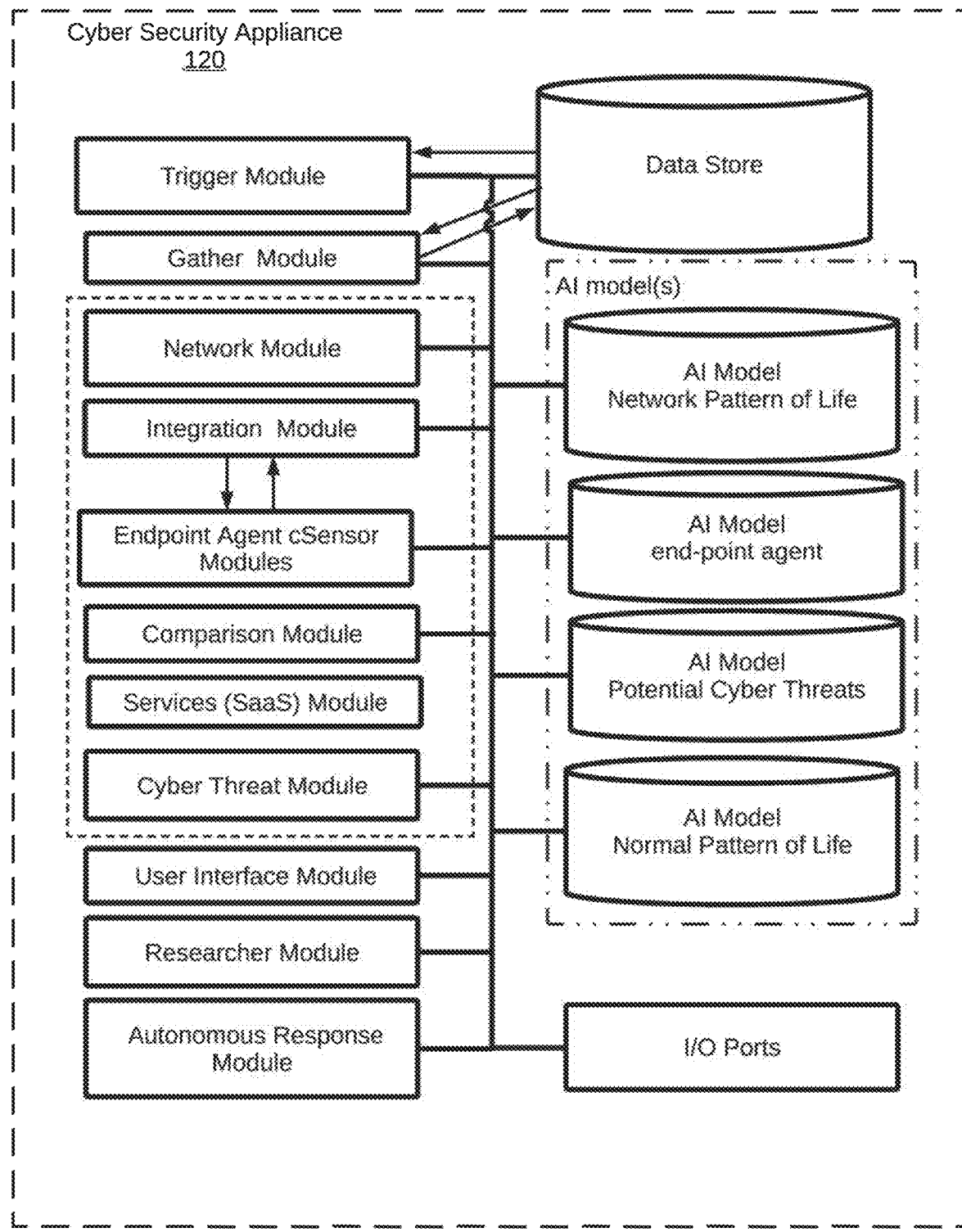
FIG. 4 illustrates a block diagram of a cyber security appliance with various modules cooperating with one or more machine learning models trained on the discrete pattern of life of various types of network events of network entities observed by various endpoint agent sensors, in accordance with an embodiment of the disclosure.

Referring now to FIG. 4, an exemplary block illustration of a cyber security appliance 120 is shown, in accordance with an embodiment of the disclosure. In the illustrated embodiments, the cyber security appliance 120 may be substantially similar to the cyber security appliance 120 depicted above in FIGS. 1A and 2-3. Furthermore, as shown in FIG. 4, the illustrated embodiments of the cyber security appliance with an endpoint agent cSensor as well as a cyber threat module that references machine-learning models that are trained on the normal behavior of network activity and user activity associated with a network. The cyber threat module determines a threat risk parameter that factors in 'what is a likelihood of a chain of one or more unusual behaviors of email activity, network activity, and user activity under analysis that fall outside of being a normal benign behavior;' and thus, are likely malicious behavior.

The cyber security appliance 120 may protect against cyber security threats from an e-mail system or other communication system, as well as its network. The cyber security appliance 120 may include components such as i) a trigger module, ii) a gather module, iii) a data store, iv) a collation module, v) a coordinator module, vi) a comparison module, vii) a cyber threat module, viii) a researcher module, ix) a host module (e.g., host-based endpoint agent cSensors), x) a scoring module, xi) a user interface module, xii) an autonomous action module, xiii) a communication module, xiv) at least one input or output (I/O) port to securely connect to other ports as required, xv) one or more machine-learning models such as a first Artificial Intelligence model trained on characteristics of vectors for malicious activity and related data, a second Artificial Intelligence model trained on the characteristics of external hosts and the interaction of network entities with external hosts, a third Artificial Intelligence model trained on potential cyber threats, and one or more Artificial Intelligence models each trained on different users, devices, system activities and interactions between entities in the system, and other aspects of the system, as well as xvi) other similar components in the cyber threat defense system.

The AI model of the normal pattern of life for the independent system can use unsupervised machine learning algorithms and feedback on the data and/or the meta data from the protocols and data types in the various layers to routinely update the AI model of the normal pattern of life during an operation of the independent system. The core processing is versatile and does not require tailored algorithms to each platform to produce anomaly detection outputs.

An AI model can be trained to model the normal pattern of life for the independent system from the data and/or the meta data from the protocols and data types in any of i) a data link layer, ii) a physical layer, or iii) both; and then, one or more of the following network stack layers when that layer is utilized in the independent system. The following network stack layers can include any of iv) an application layer, v) a transport layer, vi) a network layer, and vii) any combination of these three layers when that layer is utilized in the independent system. The AI model of the normal pattern of life for the independent system can use unsupervised machine learning algorithms and feedback on the data and/or the meta data from protocols and data types in the network stack layers utilized in that independent system to routinely update the AI model of the normal pattern of life of the independent system, during an operation of the independent system.

The cyber-defense appliance securely communicates and cooperates with a suite of different endpoint agent cSensors that can ingest onboard traffic from multiple different independent systems using protocols for at least one of a data link layer, a physical layer, and then one or more of an application layer, a transport layer, a network layer, and any combination of these layers when a protocol is used in that layer in the independent system. The centralized cyber security appliance 120 can securely communicate and cooperate with a suite of two or more different endpoint agent cSensors that have 1) one or more protocol analyzers, 2) an address and mapping to an interface with a third party protocol analyzer, 3) an address and mapping to a different interface for the cyber security appliance 120.

As described above, one or more endpoint agent cSensors may be integrated within an independent system to extend monitoring and gathering of data capability of the cyber security appliance 120. The endpoint agent cSensor provides at least remote monitoring and gathering on 1) data, 2) meta data, and 3) a combination of both, from one or more protocols and data types utilized in any of i) a data link layer, ii) a physical layer, or iii) both; and then, one or more of the following network stack layers when that layer is utilized in the independent system. The endpoint agent cSensor may be implemented external to the main system and receive system information as metadata from a third-party sensor or processor, perform a limited amount of onboard analysis or protocol parsing to retrieve the desired network-layer data, and is sensitive to the specifics of independent systems of this nature (such as, but not limited to, bandwidth limitations, power availability and intermittent network access).

The endpoint agent cSensors are part of a suite of two or more different endpoint agent cSensors (e.g., as shown with the cSensors 105A-D in FIG. 1A). Each endpoint agent cSensor can have one or more protocol analyzers for monitoring and gathering of 1) data, 2) meta data and 3) a combination of both, analyzer for monitoring and gathering of 1) data, 2) meta data and 3) a combination of both, from a first protocol and data types in the data link layer in the independent system including protocol types and data types which are encapsulated by previously unfamiliar physical layer and/or data link layer protocols to the system. For example, a first endpoint agent cSensor has a first protocol analyzer for monitoring and gathering of 1) data, 2) meta data and 3) a combination of both, from a first protocol and data types in the data link layer in the independent system. The first protocol in the data link layer can be, for example, Address Resolution Protocol, Neighbor Discovery Protocol, Open Shortest Path First, Tunnels L2TP, Point-to-Point Protocol, Medium access control protocol, Logical link control (LLC), ISDN, FDDI, etc.

Another endpoint agent cSensor can have a second protocol analyzer for monitoring and gathering of 1) data, 2) meta data and 3) a combination of both, from a second protocol and data types in the physical layer in a second independent system. Some example protocols in the physical layer can be, for example, Digital Subscriber Line, UTP, RS-232, Plesiochronous Digital Hierarchy, Synchronous Digital Hierarchy, Synchronous Optical Networking, Passive Optical Network, OTN, numerous 802 IEEE standards, Universal Serial Bus, Bluetooth, RS-449, etc.

The endpoint agent cSensors ingest onboard traffic from any of sensors and other components within the independent system they integrate in, in order to communicate their data and/or meta data to the cyber security appliance 120. The endpoint agent cSensors ingest onboard traffic from any of the sensors and the other components within the independent system in order to derive the data and/or meta data from the one or more protocols and data types to be sent on to cyber security appliance 120. The data can be routed for the express purpose of sending to the centralized appliance, and/or the data can be produced for a different purpose but then the cyber security appliance can be sent a copy of that data for its own analysis.

The cyber security appliance 120 securely communicates and cooperates with the suite of two or more different endpoint agent cSensors that have 1) one or more protocol analyzers, 2) an address and mapping to an interface with a third party protocol analyzer, 3) an address and mapping to an interface with the cyber security appliance 120. The probes can ingest onboard traffic from a plurality of different independent systems, such as i) Internet of Things (IoT) devices, ii) autonomous driving vehicles, iii) ships, iv) airplanes, v) etc., using protocols in 1) an application layer, 2) a transport layer, or 3) a network layer encapsulated in an unfamiliar data link layer, or physical layer.

The cyber security appliance 120 has one or more AI models configured to model a normal pattern of life in each of the independent systems using 1) data, 2) meta data and 3) a combination of both, from protocols for at least 1) the network layer and/or 2) the transport layer for data encapsulated by physical and datalink layer protocols specific to the independent system. The AI model can model the normal pattern of life for 1) data, 2) meta data and 3) a combination of both, from one or more protocols and data types utilized in any of i) a data link layer, ii) a physical layer, or iii) both; as well as, 1) data, 2) meta data, and 3) a combination of both, from protocols in any of iv) an application layer, v) a transport layer, vi) a network layer, and vii) any combination of these three layers when a protocol is used in that layer in the independent systems. Thus, one or more artificial intelligence models trained to model the normal pattern of life for 1) data, 2) meta data, and 3) a combination of both, from the unusual protocols and data types being analyzed in these independent systems. The endpoint agent cSensors integrated into the independent systems may have one or more protocol analyzers to analyze the activity in the protocols and data types used in any of i) a data link layer, ii) a physical layer, iii) an application layer, iv) a transport layer, v) a network layer, and vi) any combination of these layers when a protocol is used in that layer in the independent system. The data points can be securely conveyed back to the cyber security appliance 120 which has generally AI models trained, for each independent system, to model a normal pattern of life using 1) data, 2) meta data, and 3) a combination of both in the protocols and data types used in at least the physical layer and/or protocols and data types used in the data link layer.

The analyzer module cooperates with the one or more AI models trained to model a normal pattern of life in each of the independent systems to determine when any of i) an abnormal behavior, ii) a suspicious activity, and iii) any combination of both is detected in that independent system, which at least uses the protocols in at least one of 1) the data link layer and 2) the physical layer. Each AI model can be trained to model the normal pattern of life of a given independent system, such as an IoT device's pattern of life, which uses the 1) data, 2) meta data, and 3) a combination of both in the protocols of at least 1) the data link layer and 2) the physical layer.

The trigger module may cooperate with one or more AI models trained with machine learning on a normal pattern of life in the system, at least one of i) an abnormal behavior, ii) a suspicious activity, and iii) any combination of both, from one or more entities in the system. Upon detecting the i) abnormal behavior, ii) a suspicious activity, and iii) any combination of both. The trigger module cooperates with the analyzer module on what additional types of data points are needed to support or refute a given cyber threat and then cooperate with the data gather module to obtain that data.

The cyber security appliance 120 may have a cyber threat analyst module. The cyber security appliance 120 may use i) one or more AI models to form and investigate hypotheses, ii) a set of scripts to form and investigate hypotheses, and iii) any combination of both, in order to form and investigate hypotheses on what are a possible set of cyber threats. The cyber threat analyst module to form and investigate hypotheses on what are a possible set of cyber threats can use any of i) the one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both.

The cyber threat analyst module forms and investigates hypotheses on what are a possible set of cyber threats cooperates with the analyzer module to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

In some embodiments, the cyber threat defense system 100 includes a probe module, and instant messaging (IM) module and a coordinator module.

The probe module can be configured to collect probe data from a probe deployed to a network entity. The network entity represents at least one of a user device and a network device interacting with the network. The probe data describes any activity executed by the network entity and administrated by a network administrator associated with the network. Such network-administrated activity would be external to any activity by a SaaS application executed by the network entity, which is hosted by a third-party platform. A network-administrated activity may be instant messaging activity, email activity network activity, or SaaS activity. Note, the probe module may be divided into an instant messaging module, an email module, a network module, and a SaaS module.

A cyber threat defense system can incorporate data from an instant messaging platform administrated by the client system or a third-party operator to identify cyber threats related to instant messaging. The cyber threat defense module can have an instant messaging module to collect instant messaging data from the instant messaging platform. The cyber threat defense system can have a comparison module to compare instant messaging data for a user to at least one machine-learning model of a network entity using a normal behavior benchmark to spot behavior deviating from normal benign behavior. The comparison module can identify whether the user is in a breach state. The cyber threat defense system can have a cyber threat module to identify whether the breach state and a chain of relevant behavioral parameters correspond to a cyber threat. The cyber threat module can further apply one or more artificial intelligence classifiers to the instant message based on the user risk profile. An autonomous response module can execute an autonomous response in response to the cyber threat. The autonomous response module, rather than a human taking an action, can be configured to cause one or more rapid autonomous actions to be taken to contain the cyber threat when the threat risk parameter from the cyber threat module is equal to or above an actionable threshold.

The cyber threat defense system can have one or more ports to connect to one or more probes monitoring multiple network devices that utilize instant messaging, email, network, or SaaS applications. One or more instant messaging modules can be configured to connect to one or more instant messaging connectors. Each instant messaging module can be configured to collect instant messaging data describing communications on a given instant messaging platform. The instant messaging data may include participants, text content, links, attachments, or apps. The instant messaging module can harvest from the instant messaging data those participants, text content, attachments, hyperlinks, and apps. In addition to the instant messaging module, other probe modules can be configured to collect, from the one or more probes, probe data describing email activity, network activity, or SaaS application activity executed by the user.

The instant messaging module can be configured to collect instant messaging data, in conjunction with the probe module, from one or more network entities that utilize one or more instant messaging platforms. The instant messaging data describes an instant message associated with a user for use in identifying a cyber threat. The instant messaging data can be associated with a user account on at least a first instant messaging platform. Examples of an instant messaging platform may include Slack®, Microsoft Teams®, or iMessage®. A third-part operator may administrate the instant messaging platform. The cyber threat defense system can have a connector remotely installed on each network entity that utilizes the instant messaging platform. The at least one connector can access the instant messaging data via an application programming interface (API) for the instant messaging platform, by accessing a messaging archive provided to the client system by the instant messaging platform, or by executing a mobile device management sub-module. The instant messaging module can connect to the connector via at least one input port. The cyber threat defense system can have an instant messaging module for each instant messaging platform used by the users on the network.

The instant messaging module may use a variety of approaches to retrieve instant messaging data from an instant messaging platform. In one approach, the instant messaging module can access a messaging archive already provided to the client system by the instant messaging platform. Instant messaging platforms often provide these messaging archives to corporate clients for legal or compliance purposes. The instant messaging module can piggyback off this existing infrastructure. The client system can retrieve the messaging archive using a web hook provided by the instant messaging platform. The instant messaging module can provide a client authorization to the web hook for the instant messaging platform to indicate that the client allows the cyber threat defense system to access the messaging archive. The instant messaging module can use a web hook for the instant messaging platform to gather the messaging archive for the client system on the instant messaging platform. The instant messaging module can then access the messaging archive to collect the instant messaging data for the user account.

In an alternate approach, the instant messaging module can poll the instant messaging platform directly for the instant messaging data. The instant messaging module may set a polling period to specify a time frame for the instant messaging data. The instant messaging module can poll an application programming interface of the instant messaging platform for the instant messaging data associated with the user account. The instant messaging module can translate the instant messaging data into a universal format. The instant messaging module can then harvest at least one of participants, text content, attachments, hyperlinks, and apps from the instant messaging data.

In a further approach, the instant messaging module can use a mobile device management sub-module. A mobile device management sub-module manages mobile devices used within the client system. The instant messaging module can execute the mobile device management sub-module to identify and extract the instant messaging data for the instant messaging module. The mobile device management sub-module in the instant message module can gather a messaging archive form the instant messaging platform.

The probe modules monitoring email activity, network activity, and SaaS activity and the instant messaging module monitoring instant messaging platforms may each feed their data to a coordinator module to correlate causal links between these activities to supply this input into the cyber threat module. The coordinator module can be configured to contextualize the instant messaging data from the one or more instant messaging modules with the probe data from the one or more probe modules to create a combined data set for analysis. The coordinator module can use a composite user profile to connect communications from the different instant messaging platforms with events from the one or more probe modules.

The cyber threat defense system 100 may further include a user specific profile module and a risk profile module.

The user specific profile module can construct a composite user profile to identify a user across multiple internal and third-party platforms. The user specific profile module can construct a composite user profile describing the user based on user context data collected from instant messaging platforms, email platforms, information technology networks, cloud platforms, and SaaS platforms collected by context gatherers in the gather module. In preferred embodiments, the user context data may include one or more of a user name field, a display name field, a full name field, a language field, a groups field, a job title field, a roles field, a licenses information field, a registered devices field, a click profile field and or a platform risk field. The user specific profile module can associate the composite user profile with the instant messaging data. The user specific profile module can match the user context data from collected by the gather module from internal and external sources. The user specific profile module can apply a fuzzy classifier to the user context data from the context gatherer to match with other user context data. The user specific profile module can generate a confidence score for a match between the user context data from the context gatherer with separate user context data from other context gatherers at other modules associated with other applications and platforms. The user specific profile module can adjust the confidence score based on the instant messaging data. The user specific profile module can be configured to identify a user of a client system associated with the user account based on a composite user profile constructed from user context data collected across multiple platforms of the client system. The composite user profile for the multiple platforms of the client system can factor in data from the instant messaging platform as well as at least one of a SaaS platform, a cloud platform, an information technology network, and an email platform associated with the user.

The risk profile module can associate the user with a user risk profile based on the composite user profile. The risk profile module is configured to assign a user importance score to the user risk profile of the user based on the composite user profile to indicate a potential sphere of influence of the user. The potential sphere of influence refers to the number of services and resources that the user can affect. The risk profile module can assess the potential sphere of influence of the user based on at least one of administrative permissions, lateral movement, action persistence, and file access. Lateral movement refers to the ability of a user to move across services. Action persistence refers to the extent that an action by a user can allow that user to either remain in an environment undetected or shift to a new compromise method to remain in the network when detected. For an example of action persistence, a bad actor, acting as the user, can create an inbox rule that forwards all the user's emails to the bad actor in case the user's password is reset to kick the bad actor out of the user's inbox. In a further example of action persistence, a bad actor can have the ability to create new user accounts allowing them to login undetected.

The risk profile module can generate a vulnerability score by applying a set of one or more artificial intelligence classifiers to the instant messaging data based on the user risk profile. The artificial intelligence classifiers can include one or more of a personal name classifier, a password classifier, an account login activity classifier, a time series classifier, a bad link analysis classifier, an attachment classifier, natural language processing, a sentiment analysis, a keyword trend analysis classifier, a compliance classifier, and a general normality classifier. The risk profile module can execute a sentiment analysis of text content of a first instant message to determine a tone of the text content. The risk profile module can execute a keyword trend analysis of the instant message to look for words of interest. The risk profile module can assess compliance of the instant message with client system protocols describing a policy set instated by the client system.

The risk profile module can factor the user importance score and the vulnerability score into the user risk profile to calculate a degree of damage. The risk profile module can adjust the normal behavior benchmark based on the user risk profile. The user specific profile module, the risk profile module, a comparison module and a cyber threat module may be combined into a user risk module.

Furthermore, as described above, the trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise multiple automatic data gatherers that each look at different aspects of the data depending on the particular hypothesis formed for the analyzed event and/or alert. The data relevant to each type of possible hypothesis will be autonomously pulled from additional external and internal sources. Some data is pulled or retrieved by the gather module for each possible hypothesis. A feedback loop of cooperation occurs between the gather module, the collation module monitoring network and email activity, the comparison module to apply one or more models trained on different aspects of this process, and the cyber threat module to identify cyber threats based on comparisons by the comparison module. While an email module is mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the collation module and the coordinator module may be portions of the cyber threat module.

A collation module can be configured to collect a set of input data, which may include instant message data, gathered by a cyber defense appliance situated within a network and an optional series of probes deployed to a set of distributed entities such as SaaS or Cloud environments throughout a network. The network entity represents at least one of a user and a network device interacting with the network. The probe data describes any activity executed by a network entity in a distributed network located and administrated by a network administrator and associated with a first network such as a third-party Cloud or SaaS environment. A distributed network may be made up of one or more combinations of devices, sub-networks, virtual networks, virtual servers, virtual devices, Cloud infrastructure, or third party IaaS, PaaS and SaaS Platforms. A network-administrated activity may be network activity, email activity, or other application activity. Further, the collation module may be divided into an email module and a network module. The collation module monitoring network entity activity may feed collected data to a coordinator module to correlate causal links between these activities to supply this input into the cyber threat module. The collation module performs i) passive ingestion of input data as well as ii) potentially active collection of input data and iii) also collates connection content for the other modules.

The cyber threat module may also use one or more machine-learning models trained on cyber threats in the network. The cyber threat module may reference the models that are trained on the normal behavior of user activity and network activity associated with the network. The cyber threat module can reference these various trained machine-learning models and data from the collation module and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The one or more machine learning models can be self-learning models using unsupervised learning and trained on a normal behavior of different aspects of the system, for example, device activity and user activity associated with a network host, such as a website, or an instant messaging platform. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber security appliance 120 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber security appliance 120 may also include one or more machine learning models trained on gaining an understanding of a plurality of characteristics of a connection event where a network entity interacted with an external host and related data including classifying the properties of the connection event and its meta data.

The cyber threat module can also reference the machine learning models trained on the input data to determine if an external host connection event or a series of external host connection events under analysis have potentially malicious characteristics. The cyber threat module can also factor this external host connection event characteristics analysis into its determination of the threat risk parameter. The cyber threat module can generate a set of incident data describing an anomalous external host connection event by an entity, here representing a user or a device participating in the network. The cyber threat module can use the incident data to determine whether the anomalous event indicates a breach state representing a malicious incident. The cyber threat module can use the user interface and display module to present the incident data to a user analyst for review, response and/or resolution. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber security appliance 120 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity, instant messages, or emails. One or more machine learning models may be trained by observing the connection events between network entities and external hosts, and the characteristics of the external hosts in question.

The cyber security appliance 120 may supplement the data provided to the users and cyber professionals using a researcher module. The researcher module operates an artificial intelligence (AI) algorithm to assess whether the anomalous network activity has any salient features in common with activity which has previously appeared in other published threat research, whether internal or external, international security community platforms, or known lists of malicious files or internet addresses. The researcher module can consult internal threat databases or external public sources of threat data. The researcher module can collect an outside data set describing at least one of an action or a state related to the cyber threat present outside of the network from at least one data source outside the network. The researcher module is configured to assess the validity of the threat intelligence derived from the intelligent resources through a machine learning modelling of the value of the data and assign a confidence weighting to the external host information gathered from the intelligent resources. The confidence weighting can take into account features such as the internal/external nature of the source, the age of the source, the distance of the source intelligence from the specific external host seen, all assessed by machine learning models to create variable weightings.

The cyber security appliance 120 can then take actions to counter detected potential cyber threats. The autonomous action module, rather than a human taking an action, can be configured to cause one or more rapid autonomous actions to be taken to contain the cyber threat when the threat risk parameter from the cyber threat module is equal to or above an actionable threshold.

The autonomous response module can interact with the instant messaging module and the cyber threat module to automatically respond to any issues with a user on an instant messaging platform. The cyber threat module may analyze the instant messaging data from an instant messaging platform to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. A connector may query an instant messaging platform to discover available responses to a cyber threat, such as suspension of user accounts or curtailing user privileges. The instant messaging module may collect those responses from the connector to provide to the autonomous response module. The autonomous response module can execute an autonomous response in response to the cyber threat factoring in the user risk profile.

The cyber threat defense system can decide based upon the cyber threat detected that limiting access to or deleting a suspect instant message is the most appropriate and least disruptive method to suppress the action. The cyber threat defense system can go further and revoke various permission levels for the user, log the user out of the user account, or disable the user account or device for a fixed period. Note, the cyber threat defense system is not limited to applying this method just on the specific instant messaging platform where the threat was detected. The user may be logged out or disabled on all distributed platforms, such as cloud, email, network, or various SaaS applications due to potentially malicious actions on the physical network. The autonomous response module thus can log users out of their accounts, disable their accounts for a period of time, etc.

Further, the instant messaging module can be configured to analyze content contained within one or more instant messages in an instant messaging platform. For example, the instant messaging module can analyze text within the instant messages. A cyber threat module is configured to cooperate with the instant messaging module to analyze for any potential malicious behavior deviating from a first user's normal behavior compared against an artificial intelligence model trained on maintaining a pattern of life of the first user in the instant messaging system. The comparison can indicate a possible cyber threat has compromised the instant messaging platform. The instant messaging module can analyze content contained within the one or more instant messages, including the text within the instant messages, for compliance violations by the one or more instant messages compared to a policy set for a client system that uses the instant messaging platform. An autonomous response module can be configured to cooperate with an application programming interface of the instant messaging platform to take an autonomous action itself, rather than a human taking the action, to mitigate against the first compliance violation or the first potential cyber threat.

The cyber threat module's configured cooperation with the autonomous action module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The cyber threat defense system can collect data from a set of external third-party sources to accurately assess network hosts accessed by a network entity. A network entity represents a user or a network device on a network. The collation module can collect, by passive ingestion of a cyber defense appliance situated at some point within the network and one or more optional probes communicating with a distributed network entity, a host identifier identifying an external host accessed by a network entity and the characteristics of the connection event. Upon identifying the host, the cyber threat defense system can have a researcher module configured to collect host research data from an intelligence resource. The host research data describes the external host identified by the collation module. The intelligence resource is a data source not affiliated with the main network. The researcher module is configured to periodically refresh this host research data to maintain up to date content regarding the external host.

The cyber threat defense system can have a host module configured to determine one or more host metrics using one or more machine learning models. The host module can train the one or more machine learning models on a normal benign connection behavior between an external host and a network entity to spot behavior deviating from the normal benign external host connection behavior. The machine learning model uses a normal host behavior benchmark. The normal host behavior benchmark describing parameters corresponding to a normal pattern of activity for a communication between a network entity and an external host, and the 'normal' characteristics of observed external hosts derived by the collation module. Further, the host module is configured to associate a connection entity data set with the host identifier and derive a network entity alias for the network entity from observed behavior across the network. An entity data set describes the characteristics of at least one interaction between the network entity and the external host. A network alias describes the possible derived role of the network entity in the network, such as a Server or a Desktop, as identified by the cyber threat defense system from behavioral markers.

The cyber threat defense system can have a scoring module configured to analyze the host research data from the researcher module in collaboration with the host metrics from the host module. The scoring module may take into account the confidence weightings created by the researcher module and attributed to the host research data when performing an analysis. The scoring module is configured to generate an automatic threat score describing an autonomously-determined threat level presented by the external host based on at least the host research data. The scoring module can factor the connection entity data set into calculation of the automatic threat score as an indicator of network-wide and peer-wide interaction with the external host. The automatic threat score may be generated based upon only the host research data and a machine learned clustering of similarly characterized external hosts, before a network entity is even seen interacting with the host. The scoring module is configured to update the automatic threat score based on at least one analyst threat score describing an analyst-determined threat level. The scoring module is configured to update the automatic threat score based on periodically updated data from the researcher module.

Once the scoring module calculates an automatic threat score, the cyber threat defense system has a user interface module to present that score to a user analyst. The user interface module is configured to generate a threat-tracking graphical user interface to present to the user analyst in a display. The user interface module is configured to present input data in the threat-tracking graphical user interface. The input data may list a series of host identifiers representing external hosts visited by the network entity. The user interface module can identify a hover-over input over one of the external host identifiers. A hover-over input is an input received by hovering a cursor over the external host identifier without clicking on the external host identifier. The user interface module is configured to generate a hover-over box in response to the hover-over input. The hover-over box presents the automatic threat score to the user analyst. The user interface module can identify a clickthrough input in relation to the host identifier. A clickthrough input is an input received by a user clicking on the external host identifier. The user interface module is configured to generate a popup box to present the automatic threat score in response to a clickthrough input. The user interface module is configured to operate the popup box.

The popup box can present an anonymized alias for network entity data values such as host name or username, representing the network entity without compromising any personally identifiable information. A system user with sufficient clearance can reveal the true value of the network entity data fields if malicious activity is discovered. The popup box can present the host identifier to indicate the external host being investigated. The popup box can present the host research data the researcher module has collected from an intelligence resource. The popup box can present the automatic threat score describing an autonomously-determined threat level based on the host research data. The popup box can receive an analyst threat score from the user analyst. The analyst threat score describes an analyst-determined threat level. The scoring module can create a combined threat score based on the analyst threat score and the automatic threat score. The popup box can receive an analyst context comment from the user analyst. The analyst context comment explains the reasoning behind the analyst threat score.

Alternately, the popup box can receive an analyst threat score from an autonomous analyst. In the case of an autonomous analyst, an analyst threat score may represent a judgement based on the severity of the breach state where the external host was observed by the autonomous analyst as involved in the cyber threat breach. The scoring module can create a combined threat score based on the autonomous analyst threat score and the automatic threat score. The popup box can receive an analyst context comment from the autonomous analyst. The autonomous analyst context comment may present salient features of the analysis by the autonomous analyst such as filenames, file hashes, and IP addresses involved in the breach. The autonomous analyst context comment may also describe one or more salient features of the breach state observed by the autonomous analyst where the external host was linked to the formation of the breach state, such as IP Addresses or File Hashes.

The popup box can present a prior analyst threat score to the user analyst. The prior analyst threat score describes a prior analyst-determined threat level assigned by a prior user analyst. The prior user analyst may be in a trusted community of the user analyst assigned by the user to prevent both the inclusion of commentary which exposes confidential information to outside individuals and to avoid the inclusion of commentary or scores from unvetted or untrusted individuals with potential ulterior motives. The popup box can present a prior analyst context comment from the prior user analyst. The prior analyst context comment explains the reasoning behind the prior analyst threat score.

The popup box can present a prior analyst address. The prior analyst address represents the prior user analyst. Upon the user analyst selecting the prior analyst address, a communication module can establish a communication channel between the user analyst and the prior user analyst. The communication channel may be a text or email from the current user analyst to allow the user analyst to receive guidance from the prior analyst. Alternately, if the prior user analyst is available, the communication channel may be a chat, a video chat, or telephone call between the current user analyst and the prior user analyst.

The host module is configured to create a host cluster, by grouping previous external hosts sharing similar characteristics to the current external host. The popup box may present a cluster threat score, averaging the automatic threat scores for that host cluster. A host module may place an external host in more than one cluster. The host-based clustering can produce predictions on external hosts before they are observed interacting with network entities based upon a machine learning analysis of their shared characteristics and relationship to known bad external hosts. The scoring module may be configured to periodically update the automatic threat score based upon the change in average automatic threat scores for the host cluster.

Further, the user analyst can enter a threat tag via the popup box. The threat tag describes the type of threat presented by the external host to the network, and can be determined by the user analyst. If an autonomous analyst is executed by the cyber threat appliance, the tag may be selected and assigned by the autonomous analyst after categorizing the observed breach state (such as Ransomware Attack, DNS Sinkhole). The threat tag may also be suggested to a user analyst based upon closely clustered hosts. The host module is configured to group the external host in a host set based on the threat tag. For example, if the user analyst determines that the external host is distributing malware, the user analyst may enter a "malware distributer" tag to be associated with the external host. The popup box may present a tag threat score, averaging the automatic threat scores for hosts associated with that threat tag. The scoring module may update the automatic threat score based upon the automatic threat score or user analyst score for external hosts with the same tags, or based upon a general threat score associated with specific tags (such as Malware Distributor, Botnet).

The host module is configured to suggest external hosts recently seen on the cyber threat appliance which share one or more characteristics, threat tags or are closely clustered with the external host under investigation. The host module may prompt the user analyst to look at the breach state where this similar external host was involved, or investigate whether that previous appearance of a similar host was itself a breach state.

The popup box can present a malignant external host identifier set. The malignant external host identifier set represents external hosts previously accessed by the network entity. The host module can filter the malignant external host identifier set to those external hosts with an automatic threat score in a range specified by the user analyst. The host module can set the range to a default range if no range is entered by the user analyst.

The researcher module, the scoring module, and the host module, or any combination thereof, may be components of a single module.

The autonomous action module is configured to execute at least one autonomous based on the automatic threat score generated by the scoring module. The autonomous action module can alert the user analyst of an external host with an automatic threat score in a specified range. The autonomous action module can preserve these alerts in a graphical user interface until a user analyst is available for review. The autonomous action module can quarantine the external host, removing access by any part of the network. The autonomous action module can limit the privileges in relation to the rest of the network of any network entity exposed to the external host.

The cyber security appliance 120 may be hosted on a device, on one or more servers, or in its own cyber threat appliance platform.

Description of Helper Agent Modules

Figure 5:
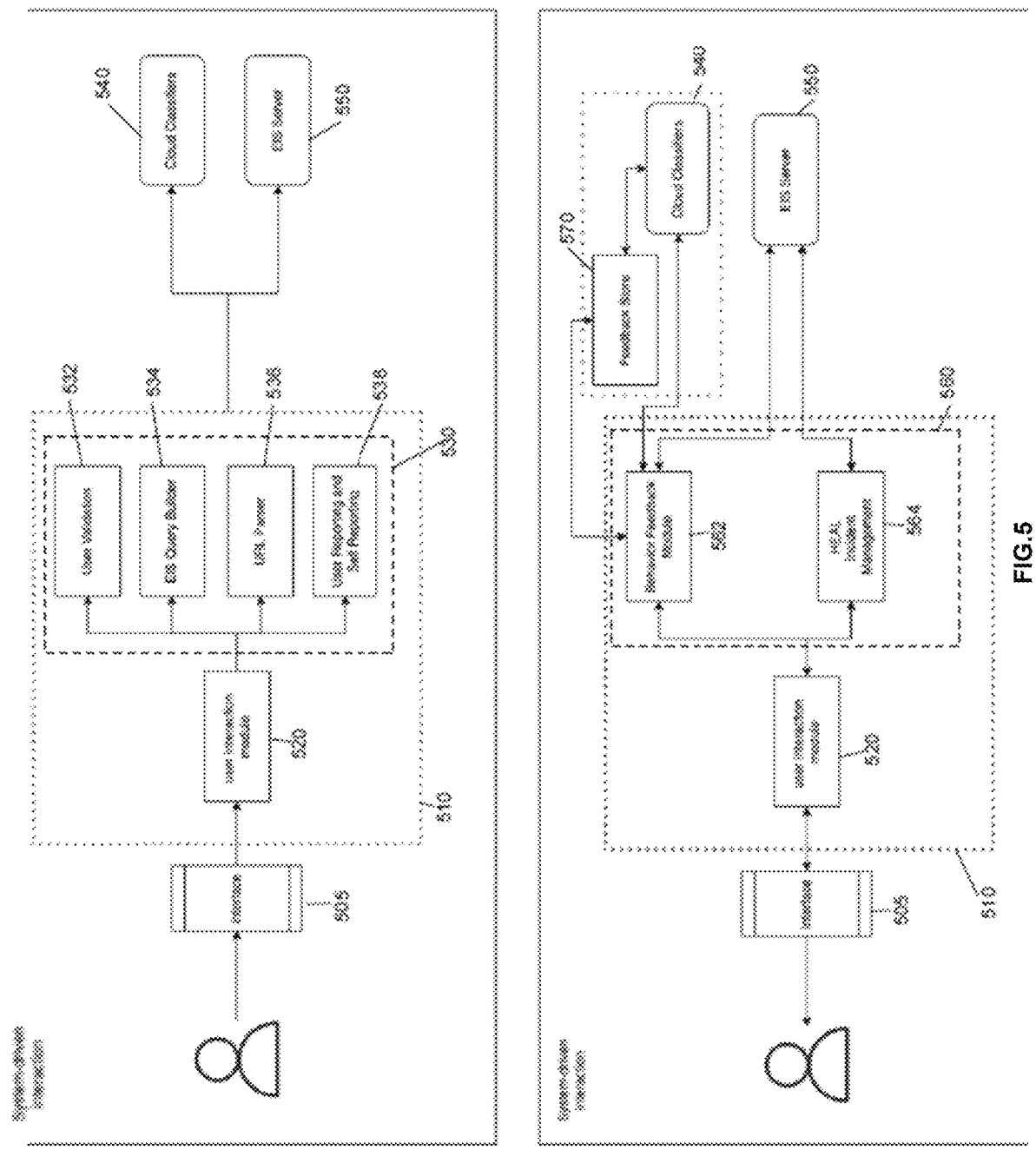
FIG. 5 illustrates a block diagram of various modules cooperating to enable a user-driven interaction between a cyber security appliance and an end user, and a system-driven interaction between the end user and the cyber security appliance, in accordance with an embodiment of the disclosure.

Embodiments of the invention enable bi-directional communication between a user interface and a cyber security system. Referring to FIG. 5, a first schematic diagram shows a user-driven interaction with the cyber security system and a second schematic diagram shows a system-driven interaction with the user in accordance with embodiments of the disclosure.

In embodiments where an interaction between the user and the cyber security system is initiated by the user, the cyber security system may include a user interface 505, a communication facilitation module 510, one or more cloud classifiers 540 and a cyber security appliance server 550. In preferred embodiments, the communication facilitation module 510 comprises a user interaction module 520 and a helper module 530. In some embodiments, the helper module 530 comprises a user validation module 532, a cyber security appliance query builder module 534, a URL parser module 536, and a reporting module 538.

The user interface 505 is configured to enable the end user of a host device 101A to interact with the cyber security appliance 120 by providing queries from the user to the cyber security system and by providing responses and queries from the cyber response system to the user. The user interaction module 520 cooperates with the user interface 505 and cyber security system to exchange information between the end user and the cyber security system and is configured to define the extent to which the end user and the cyber security system are able to exchange information. Further, the user interaction module may be configured to define the type of information that may be shared between the user and the cyber security system. In some embodiments, the user interaction module may include a module, such as a natural language processing (NLP) unit, configured to convert natural language to computer-readable language to facilitate communication between the end user and the cyber security system. The module may be further configured to convert computer-readable language to natural language to facilitate communication between the cyber security system and the end user.

The user validation module 532 may be configured to retrieve contextual information about the user, such as the user's phone number or e-mail address, and issue multi-factor authentication (MFA) codes to the user via their phone number or e-mail address in order to allow the user to verify their identity.

The cyber security appliance query builder module 534 may be configured to enable the user's query to be provided to an API that interfaces with the cyber security appliance. In preferred embodiments, this may be achieved by generating queries in machine-readable language, such as structured query language (SQL), based on a set of input data provided by the end user via the user interface 505.

The URL Parser Module 536 may be configured to analyse internet links and parse those links into their constituent parts for analysis. A URL may comprise a plurality of different components, including one or more of: a scheme, a protocol, an authority, a host, a hostname, a subdomain, a domain, a TLD, directory path, and a file name. In some embodiments, the URL Parser module 536 separates a complex URL into a plurality of URL components in human- or machine-readable format. In preferred embodiments, the URL parser module 536 is further configured to report the URL components to the cyber security system.

The Reporting Module 538 may be configured to enable end users to report unusual behavior of other users, or even themselves, to the cyber security system. The cyber security system may then perform further analysis of the use of any system accounts associated with that user. In some embodiments, the cyber security appliance may adjust one or more parameters that define the threshold for whether the use is considered to be anomalous or not.

In some embodiments, the Cloud Classifiers 540 are located external to the communication facilitation module 510 and are configured to perform an analysis to determine whether a particular internet link or user identified by the end user is anomalous.

In embodiments where an interaction between the cyber security system and the user is initiated by the cyber security system, the cyber security system may include a user interface 505, a communication facilitation module 510, cloud classifiers 540, and a cyber security appliance server 550. In preferred embodiments, the communication facilitation module 510 comprises a user interaction module 520 configured to communicate with the user interface 505 and a helper module 560 configured to communicate with the cyber security appliance server 550. In some embodiments, the helper module 560 comprises a behavior feedback module 562 and an incident management module 564. In some embodiments, the cyber security system further comprises a feedback store 570.

In preferred embodiments, the user interface 505, user interaction module 520, classifier modules, or cloud classifiers, 540 and cyber security appliance server 550 are substantially as described above.

The behavior feedback module 562 is configured to communicate with the user interaction module 520, the cloud classifiers 540, the cyber security appliance server 550 and the feedback store 570 in order to gather information concerning identified user behavior, categorize that behavior as normal or anomalous, and store that information to improve categorization of future behavior. The feedback store 570 is configured to store information regarding user behavior in order to allow the cyber security system to build a better understanding of user behavior and thereby more accurately determined whether a particular user is acting normally or anomalously. Accordingly, the behavior feedback module 562 and the feedback store 570 form part of a feedback loop that may enable the cyber security system to allocate lower risk scores to similar behaviors detected at a later date if the behavior is adequately justified.

The incident management module 564 is configured to communicate with the user interaction module 520, and the cyber security appliance server 550 in order to facilitate one or more end users directly communicating with the cyber security system regarding an ongoing cyber-threat incident.

In some embodiments the communication facilitation module 510 may be included within the host endpoint agent residing on a host device. In one embodiment, the communication facilitation module may be incorporated into the communication module of the host endpoint agent shown in FIG. 1B. In another embodiment, the communication facilitation module may reside within the host endpoint agent as a separate module to the communication module. It will be appreciated that in further embodiments the communication facilitation module 510 may reside remotely to the host device.

Operation of Helper Agent

In preferred embodiments, the modules and systems described above enable the cyber security system to perform the following functionality.

As a first example, the system may enable a user to interact with the cyber security system in order to report the suspicious behavior of a user, or a suspicious internet link. In preferred embodiments, this may be achieved by providing information associated with the suspected user or link, such as the user name or URL of the link, to the cyber security system for classification. In some embodiments, the information may be provided through an instant messaging (IM) platform, by email, or by any other suitable means of communicating with the cyber security system.

If a user is reported, then the cyber security system may be configured to provide warnings to other users that the reported user is suspected of behaving suspiciously. For example, if the reported user is a member of an instant messaging group then a warning may be issued to other members of the group that the reported user is currently under investigation for behaving suspiciously. Similarly, if the reported user attempts to join a new instant messaging group then the cyber security system would warn the existing members of the group that the reported user is currently under investigation for behaving suspiciously. In preferred embodiments, the cyber security system reviews data in stored event logs for all accounts associated with reported user in order to identify potentially anomalous behavior. In some embodiments, authorized users, such as system administrators, may request a summary of reported users within a requested time period, or example within the last week. The summary may be communicated to the authorized users by instant message, by email, or by any other suitable means of communication. In some embodiments, the user may report themselves to the cyber security system in order to self-report clicking on a suspected suspicious link.

If a user reports a suspicious link, in preferred embodiments the URL provided by the user URL is classified by one or more cloud classifiers in order to provide a severity score. In preferred embodiments, the severity score is between 0 and 100 and provides an indication of whether the reported URL is considered to be safe or malicious. In some embodiments, the cyber security system can retrieve a preview of the URL host domain or endpoint.

The cyber security system may be further configured to enable users to report their own activity as being a potential cyber security threat. For example, if a user clicks on a link that they subsequently realize is bad, then they could report that instance to the cyber security system in the manner described above.

In preferred embodiments, the above communication is achieved using preset commands. In other embodiments, natural language that is converted into computer-readable instructions or queries, for example using a NLP processor.

As a second example, the system may enable a user to interact with the cyber security system in order to obtain contextual information associated with a suspected user, device or link. In preferred embodiments, this may be achieved by providing the cyber security system with, for example, the user name or URL to the cyber security system. In some embodiments, the information may be provided through an instant messaging (IM) platform, by email, or by any other suitable means of communicating with the cyber security system.

If the user requests contextual information about another user, the cyber security system may be configured to provide different levels of response depending on the query. For example, if a user queries the name "John", the cyber security system may have records of numerous devices and software as a service (SaaS) accounts associated with the name "John". Accordingly, in some embodiments, the cyber security system may provide the user with a list of known devices and accounts associated with the user's initial query to enable the user to focus their enquiry to a targeted device or account.

Each device and account known to the cyber security system may be associated with a unique device identifier. Accordingly, the user may learn more about a targeted device or account by providing the unique device identifier to the cyber security system.

If the user queries the cyber security system about a specific device or account, then in preferred embodiments the cyber security system may provide contextual information associated with the queried device or account, including one or more of: the first time the device or account was identified by the cyber security system; the last time the device or account was identified by the cyber security system; the device type, for example desktop, laptop or mobile; the account type, for example a SaaS account; the unique device identifier associated with the device and/or account; and a summary of any instances where the device and/or account has been associated with any previously detected anomalous behavior. In some embodiments, the cyber security system is configured to provide contextual information including an indication of whether the target device or account is subject to an ongoing investigation into suspected anomalous activity. In such embodiments, the contextual information may include information associated with the anomalous activity, such as the hostname, domain or IP address accessed, and a timestamp.

In some embodiments, the cyber security system may be further configured to enable a user to query information associated with a targeted internet link, such as an identified DNS server, IP address or hostname. In such embodiments, the cyber security system may provide contextual information including one or more of: the host location of the internet link; the autonomous system number (ASN); the number of networked devices that have used the internet link; the first time the DNS server, IP address or hostname was first identified by the cyber security system; the number of networked users who have accessed the internet link; and a summary of any instances where information associated with the internet link has been associated with any previously detected anomalous behavior.

In preferred embodiments, where the cyber security system provides a summary of any instances of previously detected anomalous behavior, the contextual information may further include a severity score associated with the anomalous behavior. In preferred embodiments the severity score may be a score from 0 to 100 calculated by the cyber security system to quantify how unusual the detected anomalous activity was considered to be.

In some embodiments, aspects of the first example may be combined with aspects of the second example to enable contextual information to be provided to a user regarding a suspicious user or internet link reported by the user to the cyber security system. Accordingly, on reporting a suspicious link to the cyber security system a user would be provided with contextual information about the link that is already known to the cyber security system.

The above aspects of the invention enable a large number of users to query a cyber security system in order to report suspicious behavior, or to obtain contextual information about a suspected user, device or account. In preferred embodiments, this is achieved by using preset commands to build the user queries, and to enable the use of natural language when querying the cyber security system.

As a third example, the system may enable the cyber security system to request contextual information from the user based on detected anomalous behavior. As described further below, the cyber security system is configured to automatically detect suspicious behavior by analyzing the activity of host devices on the network. In preferred embodiments, if anomalous behavior is detected the cyber security system is configured to request that the end user provides contextual information to provide justification for the actions that were detected as being anomalous. For example, the user may be prompted to indicate whether they intended to perform a particular action, such as accessing a black-listed website. If the action was intended, then the user may be requested to provide additional reasoning to explain why they took that action and to thereby increase the contextual information that describes the rationale underlying the user's actions. In some embodiments, if the user indicates that the action was not intended, the cyber security system may implement automatic autonomous responses to, for example, mitigate or undo the unintended actions or log an unauthorized user out of an account.

In preferred embodiments, the user may be prompted to provide contextual information using an IM platform, email, pop-up messages, or by any other suitable means of communicating with the cyber security system. The user may provide the contextual information as free text or as auto-generated responses, which may subsequently be translated into machine-readable language. In preferred embodiments, the user may be provided with a series of follow-up questions in order to provide more detailed contextual information relating to the detected unusual behavior which may provide richer data for analyzing future queries.

In preferred embodiments, the user is prompted to justify an action, such as clicking on an internet link, whenever that action is determined to have a high anomaly score and so be considered to be anomalous with a high degree of fidelity. The contextual information provided by the user may be stored in the feedback store 570. In preferred embodiments, the contextual information may be used to adjust a calculated anomaly score associated with the anomalous behavior if the justification is legitimate. For example, an event may have an initial severity score of 60, but the contextual information may result in this initial score being revised higher or lower. The contextual information may also be used to categorize subsequent events that are similar, and may be clustered with such events and their associated contextual feedback in order to improve the accuracy of the one or more machine learning models that identify anomalous behavior. For example, stored contextual information may be clustered by a particular alert or event type, such as an unusual log in location, an unusual share event, or a black-listed hostname or endpoint.

Accordingly, the cyber security system may be configured to improve its ability to accurately identify anomalous behavior.

As a fourth example, the system may enable both the user and the cyber security system to initiate requesting contextual information based on detected anomalous behavior. In preferred embodiments, this may occur when seeking to verify the identity of a user which may be triggered either by a user noticing suspicious behavior, or the cyber security system detecting anomalous activity. In preferred embodiments, this may be achieved by verifying the identity of the user to the cyber security system with multi-factor authentication techniques. In some embodiments, verification may be provided through an IM platform, by email, text message, or by any other suitable means of communicating with the cyber security system. In preferred embodiments, verification may be provided by sending an authentication code to the user by one communication means, for example by text message, and then the user providing the authentication code to the cyber security system by a second communication means, for example to a chat bot on an IM platform.

In some embodiments, a user may be required to verify their identity to the cyber security system if a device associated with the user becomes compromised. In some embodiments, aspects of the fourth example may be combined with aspects of any of the first to third examples above to enable the cyber security system to initially verify the identify of a user to ensure they are authorized to receive contextual information.

Identifying Anomalous Events

Figure 6:
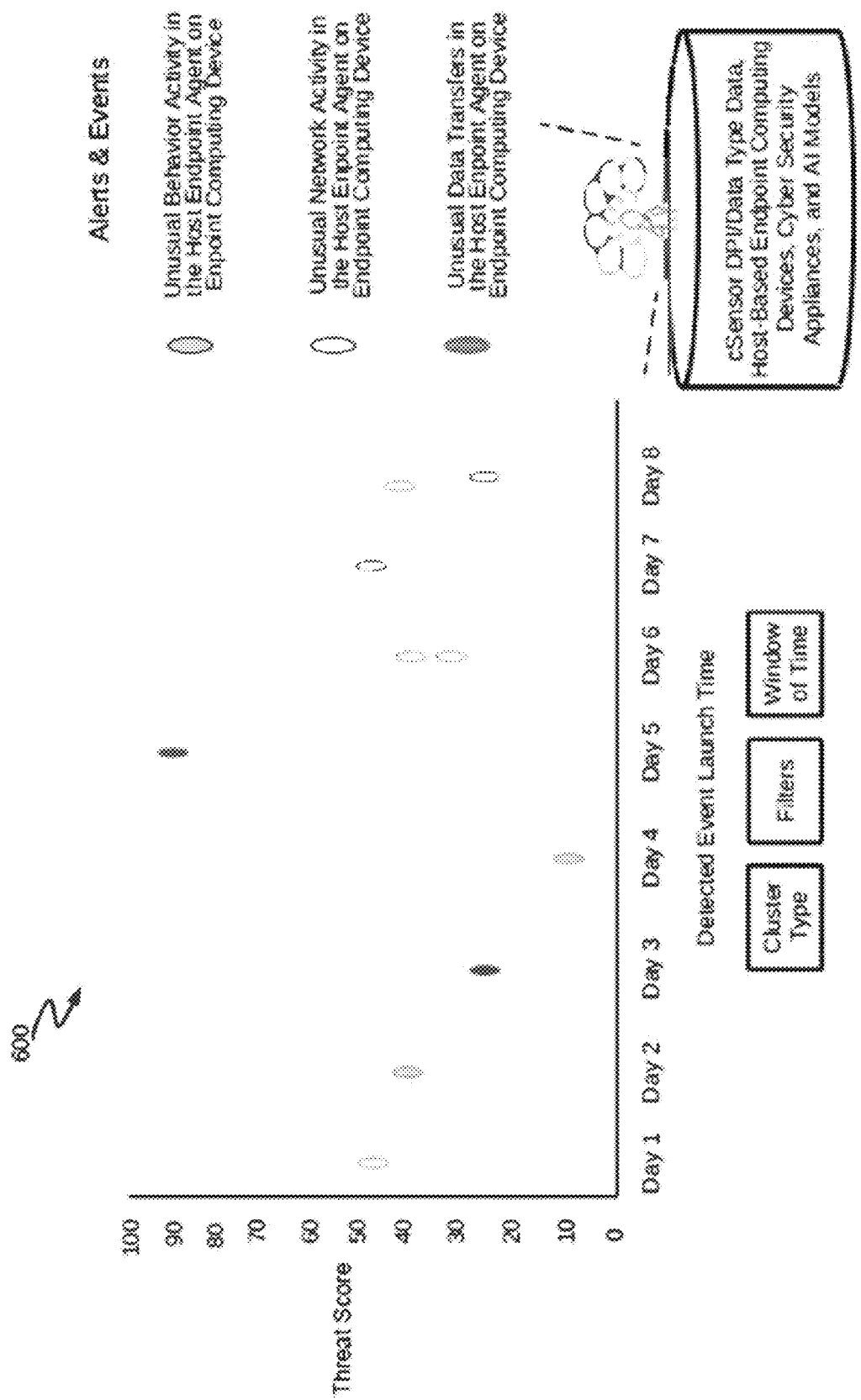
FIG. 6 illustrates a block diagram of a graph depicting various types of observed network events of unusual behavior in relation to their respective threat scores and event launch times, in accordance with an embodiment of the disclosure.

Referring now to FIG. 6, an exemplary graph 600 for depicting events and alerts triggered by various detected unusual network connectivity and behavior pattern data in relation to their cyber-threat scores and detected event launch times is shown, in accordance with an embodiment of the disclosure. The graph 600 may depict a cluster of unusual behaviors detected and analyzed in a cyber security platform, where the cluster of detected unusual behaviors may include, but are not limited to, any detected unusual payload activations based on any types of observed network activity events, such as the illustrated network, data, behavior pattern activities. For example, the graph 500 may depict one or more different machine learning models (as described above) that are trained to analyze any detected unusual behavior patterns from the collected pattern of life data against the normal pattern of life from any collected data from any of the entities in the organization. For example, the endpoint agent cSensor described above may use its analyzer module and cooperating modules to ingest all (or some) of this illustrated data to create various threat visualizer instances, reports, scenarios, and so on.

In some embodiments, the graph 600 may be provided as a user interface used to show a user the cluster of alerts and/or events associated with the variety of detected unusual network activity, data transfers, and behavior patterns, which may further include the respective detailed labels of the characteristics of such detected alerts and/or events. Note that, in these embodiments, the endpoint agent cSensor may utilize any of the AI models described above for any of its trained contextual knowledge of the organization which includes language-based data, email and network connectivity and behavior pattern data, and historic knowledgebase data.

In other examples, a behavioral pattern analysis of what are the unusual behaviors of the email/network/system/device/user under analysis by the machine learning models may be as follows. The cyber defense system uses unusual behavior deviating from the normal behavior and then builds a sequence of unusual behavior and the causal links between that sequence of unusual behavior to detect cyber threats as shown with the graph 700 in FIG. 7. In additional embodiments, the unusual patterns may be determined by filtering out what activities/events/alerts that fall within the window of what is the normal pattern of life for that network/system/device/user under analysis, and then the pattern of the behavior of the activities/events/alerts that are left, after the filtering, can be analyzed to determine whether that pattern is indicative of a behavior of a malicious actor—human, program, or other threat.

Next, the cyber defense system can go back and pull in some of the filtered out normal activities to help support or refute a possible hypothesis of whether that pattern is indicative of a behavior of a malicious actor. The analyzer module can cooperate with one or more models trained on cyber threats and their behavior to try to determine if a potential cyber threat is causing these unusual behaviors. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defense system is configurable in a user interface, by a user, enabling what type of automatic response actions, if any, the cyber defense system may take when different types of cyber threats, indicated by the pattern of behaviors under analysis, that are equal to or above a configurable level of threat posed by this malicious actor.

The AI models may perform by the threat detection through a probabilistic change in a normal behavior through the application of an unsupervised Bayesian mathematical model to detect behavioral change in computers and computer networks. The core threat detection system is termed the 'Bayesian probabilistic'. The BP approach can determine periodicity in multiple time series data and identify changes across single and multiple time series data for the purpose of anomalous behavior detection. From the email and potentially IT network raw sources of data, a large number of metrics can be derived each producing time series data for the given metric.

The detectors in the analyzer module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analyzing various aspects of the emails, iii) coming from specific devices and/or users within a system, etc. At its core, the endpoint agent cSensor as well as the cyber security appliance may mathematically characterize what constitutes 'normal' behavior in line with the normal pattern of life for that entity and organization based on the analysis of a large number/set of different measures of a device's network behavior. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI adversary red team as well as at least a set of one or more libraries of sets of contextual text, objects, and visual representations to populate on templates of pages in the email threat report based on any of the training and/or simulated attacking scenarios observed. The autonomous email-report composer can compose an email threat report on cyber threats that is composed in a human-readable format with natural language prose, terminology, and level of detail on the cyber threats aimed at a target audience being able to understand the terminology and the detail. Such modules and AI models may cooperate with the autonomous email-report composer to indicate in the email threat report, for example, an email attack's purpose and/or targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine-readable format for further use in machine-learning reinforcement and refinement, and 4) any combination of the three. The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analyzing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed above with regard to the AI adversary red team. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI adversary red team and any of its cooperating modules in that depicted system. Also note, that one or more non-transitory storage mediums are configured to store at least software associated with the endpoint agent cSensor simulator/apparatus, the other modules, and the AI models and classifiers.

Figure 7:
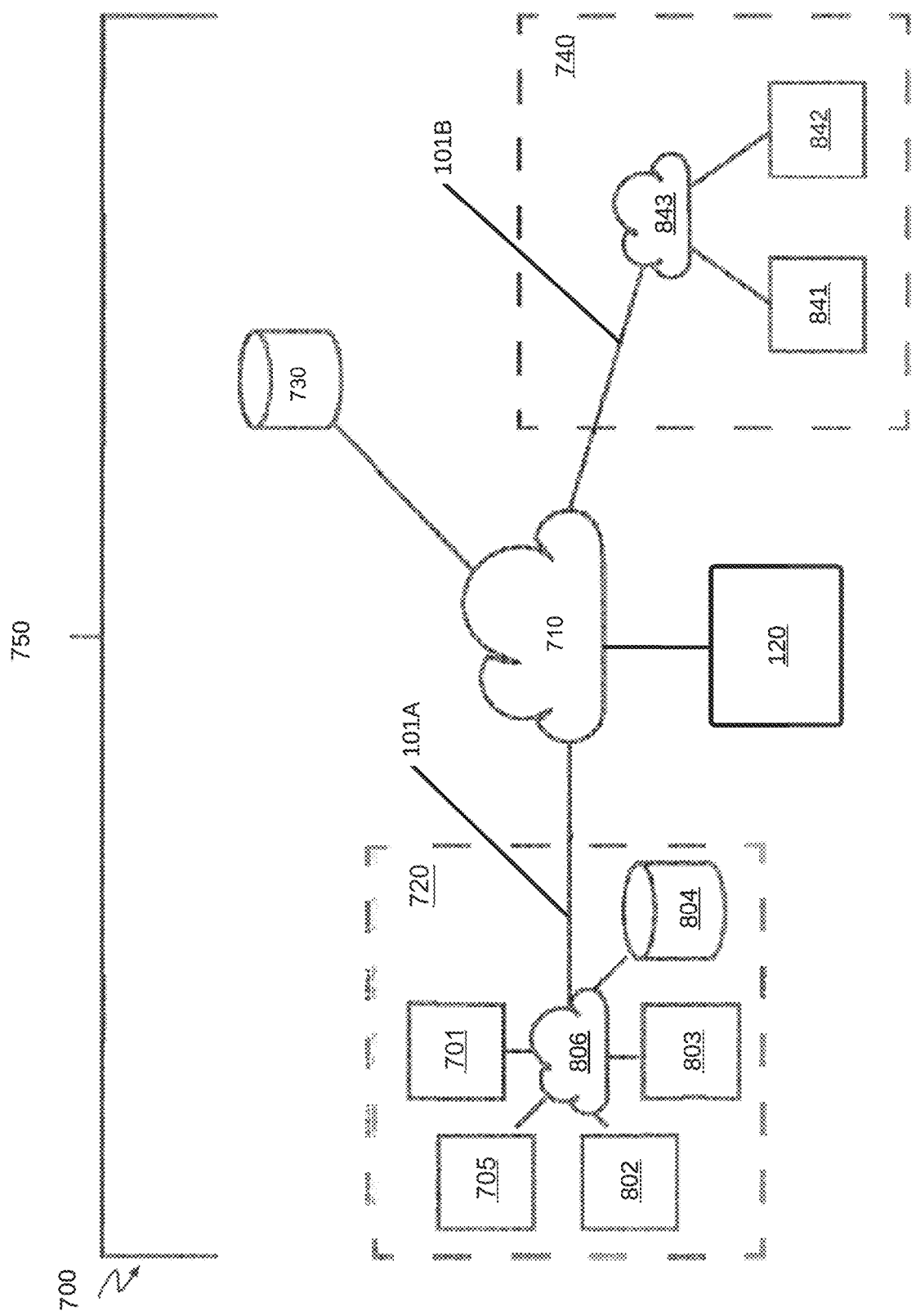
FIG. 7 illustrates a block diagram of an exemplary AI based cyber security system having an AI based cyber security appliance with one or more endpoint agents that are protecting a network, a database server, and one or more computing devices, in accordance with an embodiment of the disclosure.

Referring now to FIG. 7, an exemplary block illustration of a cyber security system 700 having a cyber security appliance 120 with one or more endpoint agents 101A-B protecting a network 710, a database server 730, and one or more computing devices 710 and 740 are shown, in accordance with embodiments of the disclosure. In the illustrated embodiments, the illustrated cyber security system 700 may include a network of computer systems 750 implementing the cyber threat detection systems, methods, and devices described herein. The cyber threat defense system 700 depicted in FIG. 7 may be similar to the cyber security systems 100 and 200 depicted above in FIGS. 1-2. For example, the cyber threat defense system 700 may configure the endpoint agents 111A-B with their respective cSensors 105A-B (and/or the cyber security appliance 120) to extend visibility and monitor the computing devices 710 and 740 communicatively coupled over the network 710.

As shown in FIG. 7, the cyber threat defense system 700 may include a network of computer systems 750 that may be using the endpoint agent cSensors 105A-B as well as the cyber security appliance 120. The exemplary system 700 depicted by FIG. 7 may be a simplified illustration, which is provided for ease of explanation of the present disclosure. For example, the network of computer systems 750 may comprise a first computer system 710 within a building, which uses the cyber threat detection system 700 to detect and thereby attempt to prevent threats to computing devices within its bounds. The first computer system 710 may comprise one or more computers 701-703, a local server 704, and a multifunctional device 705 that may provide printing and facsimile functionalities to each of the respective computers 701-703. All of the devices within the first computer system 710 may be communicatively coupled via a first network 706, such as a Local Area Network (LAN) and/or the like. Consequently, all of the computers 701-703 may be able to access the local server 704 via the network 706 and use the functionalities of the multifunctional device 705 via the network 706.

Moreover, the network 706 of the first computer system 710 may be communicatively coupled to the network 110 (e.g., the Internet), which may in turn provide the computers 701-703 with access to a multitude of other computing devices including the database server 730 and the second computer system 740. For example, the second computer system 740 may also include one or more computers 741-742 that may be communicatively coupled to each other via a second network 743 (or a second LAN).

A real-time threat detection system having autonomous actions with definitive network and/or endpoint evidence to enable rapid threat investigation and remediation is needed. In particular, a system that gives the ability to deploy instances of a host-based endpoint agent in a computing device as well as the capability to integrate the host-based endpoint agent with various operating systems (Oss) residing in the computing device is needed. Furthermore, a cyber defense platform having a series of endpoint agent sensors to monitor various types of network activities of remote entities and promptly deliver key network activity data to master appliances within a remote network defense system is needed. For example, a set of remote working devices and those remote devices that generally are not seen adequately using bulk network traffic mirroring probes/sensors is needed—in order to achieve greater and simpler extended visibility as well as increased amounts of entity identity data available for tracking.

In this exemplary embodiment, the computer 701 on the first computer system 710 may be configured by an AI cyber threat security detection system, such as the system 700 and any of the other AI based systems 100 and 200 depicted above, and therefore runs the necessary AI based threat detection processes for pentesting various attacks on the first computer system 710 for training and/or detecting vulnerabilities in that system 710. Additionally, as such, it comprises a processor arranged to run the steps of the processes described herein, memory required to store information related to the running of such processes, as well as a network interface for collecting the required information and so on. This process shall now be described in greater detail below with reference to FIG. 7.

The computer 701 may build and maintain a dynamic, ever-changing model of the 'normal behavior' of each user and machine within the system 710. The approach is based on Bayesian mathematics, and monitors all interactions, events and communications within the system 710—which computer is talking to which, files that have been created, networks that are being accessed, and so on.

For example, the computer 702 may be based in a company's San Francisco office and operated by a marketing employee who regularly accesses the marketing network, usually communicates with machines in the company's U.K. office in second computer system 740 between 9:30 AM and midday and is active from about 8:30 AM until 6 PM. The same employee virtually never accesses the employee time sheets, very rarely connects to the company's Atlanta network and has no dealings in South-East Asia. The AI based cyber threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The cyber security system with the cSensors and other similar apparatus/simulators may be built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles may be stolen so infrequently that they do not impact machine performance. But however cloaked and sophisticated the attack is, there will always be a measurable delta, even if extremely slight, in typical machine behavior, between pre and post compromise. This behavioral delta may be observed and acted on with the form of Bayesian mathematical analysis used by the AI based cyber threat security detection system installed on the computer 701.

The AI-based cyber threat security/defense self-learning platform may use machine-learning technology. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This system may therefore be built and trained to have a sophisticated 'pattern of life'—that understands what represents normality for every person, device, and network activity associated with any of the users and/or entities in such system being protected by such AI cyber threat security system. The cyber security system may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This AI cyber security system with the cSensors and other sensors may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

The autonomous response module, rather than a human taking an action, is configured to cause one or more actions to be taken to contain a detected cyber threat when a cyber-threat risk score is indicative of a likelihood of a cyber-threat that is equal to or above an actionable threshold. The cyber threat module has algorithms that can factor in confidence in correctly identifying the existence of the cyber threat, severity of the cyber threat posed that includes the type of cyber threat and the files/area of sensitivity being compromised, in order to generate the cyber-threat risk score. The cyber-threat risk score factors the analysis of the potential cyber threats on the end-point computing-device in light of the collected pattern of life data that deviates from the normal pattern of life for that end-point computing-device. Portions of the autonomous response module can be located in either in the endpoint agent 100 and in the cyber defense appliance 200.

A human user, via a programmable user interface, can preapproved one or more actions to autonomously take in order to attempt to contain a malicious threat. The preapproved autonomous actions can be set in the user interface based on both an identified cyber threat and a threat score. Different threat scores can have different preapproved autonomous actions.

Next, the endpoint agent 100 can include a unifying Endpoint Detection and Response process (EDR)/Endpoint Protection Platform (EPP) translator configured to understand and be able to exchange communications with other endpoint security processes on the endpoint computing-device. The unifying EDR/EPP translator has a set of connector Application Programming Interfaces (APIs) to map conveyed information from a plurality of different known endpoint security processes including one or more EDRs, EPPs, and any combination of both EDRs and EPPs.

Figure 8:
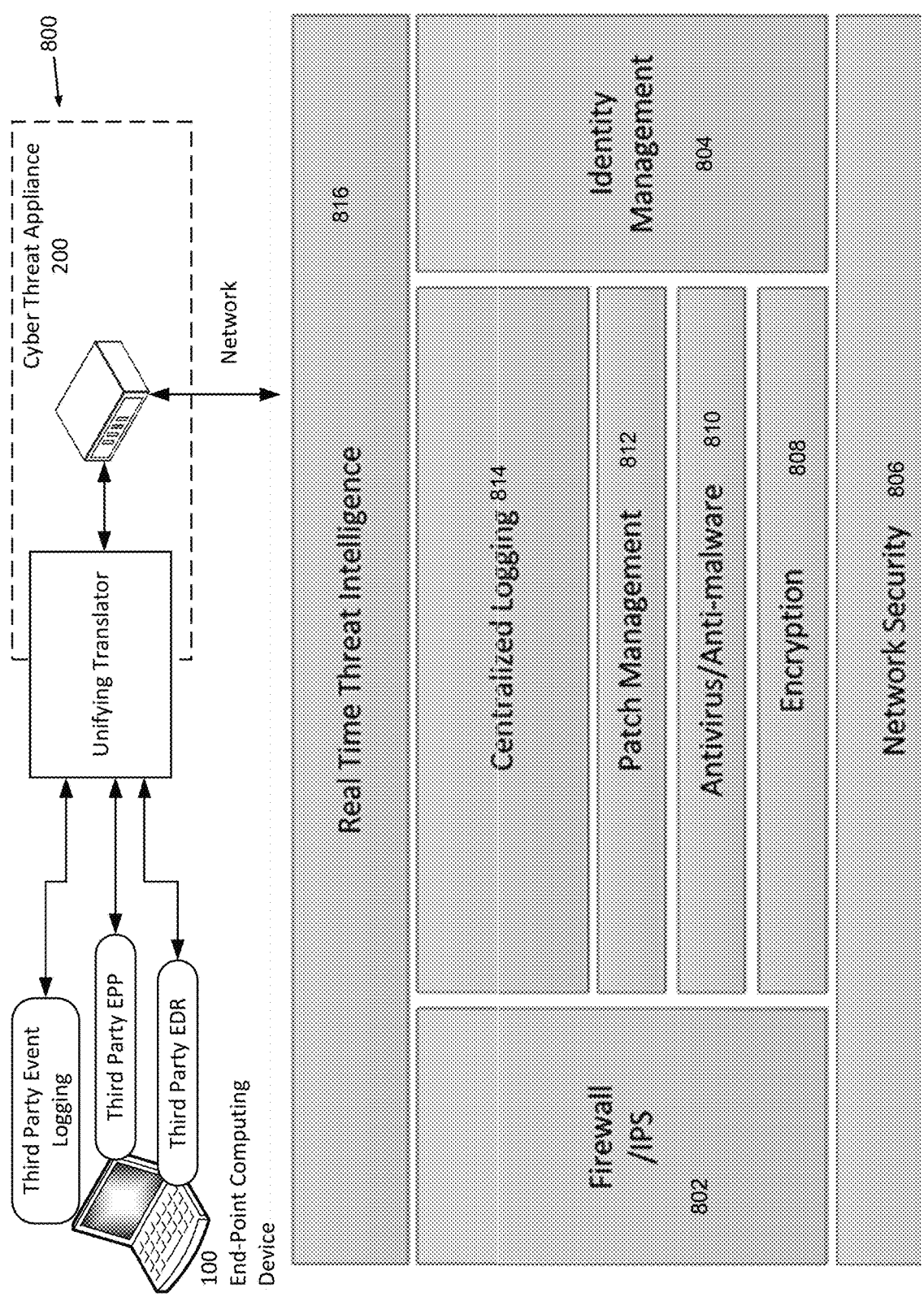
FIG. 8 illustrates a block diagram of the integration of a threat detection system with other network protections, in accordance with an embodiment of the disclosure.

FIG. 8 illustrates a block diagram of an embodiment of a unifying translator of an endpoint agent 100 configured to understand and be able to exchange communications with other endpoint security processes on the end-point computing-device via having a set of connector Application Programming Interfaces to map conveyed information from a plurality of different known endpoint security processes.

An example set of connector APIs in the unifying EDR/EPP translator to communicate with other security processes can include
Windows Event Forwarding,
Sysmon,
Any popular EDR,
Carbon Black
Crowdstrike
Endgame
Cybereason
Antivirus/malware applications or other EPP.

Note, the EDR processes can be endpoint security tools that can both detect and respond to cyber exploits as well as provide a wealth of data including alerting, and forensic analysis. An EPP can be an integrated security solution designed to detect and block threats at device level. Typically this includes antivirus processes with known signature-based detection, anti-malware processes with known signature-based detection, data encryption processes, personal firewalls, intrusion prevention (IPS) processes and data loss prevention (DLP) processes.

Note, the set of connector APIs for the unifying EDR translator can structurally have a fewer amount of APIs by mapping conveyed information from a plurality of different known EDRs & EPPs to a central tier of APIs, which further condenses the amount of separate conversions to be able to take in EDR information as well as from popular EPPs.

FIG. 8 also illustrates how the cyber threat appliance 200 and detection system may be integrated with other network protections.

A network generally has a firewall 802 as a first line of defense. The firewall 802 analyzes packet headers on incoming network data packets to enforce network policy. The firewall 802 may be integrated with an intrusion prevention system (IPS) to analyze the packet header and payload for whole events. Internally, an identity management module 804 controls the access for the users of the network.

A network security module 806 can enforce practices and policies for the network as determined by a network administrator. An encryption module 808 can encrypt communications within the network, as well as encrypting and decrypting communications between network entities and outside entities. An anti-virus or anti-malware module 810 may search packets for known viruses and malware. A patch management module 812 can ensure that security applications within the network have applied the most up-to-date patches. A centralized logging module 814 may track communications both internal to and interactive with the network. The threat detection system can act as real time threat intelligence 816 for the network. The real time threat intelligence may interact with the other defense components to protect the network.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches. For example, the machine learning learns what is normal within a network without depending upon knowledge of previous attacks. The machine learning thrives on the scale, complexity, and diversity of modern businesses, where every device and person is slightly different. The machine learning turns the innovation of attackers against them, so that any unusual activity is visible. The machine learning constantly revisits assumptions about behavior, using probabilistic mathematics. The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Figure 9:
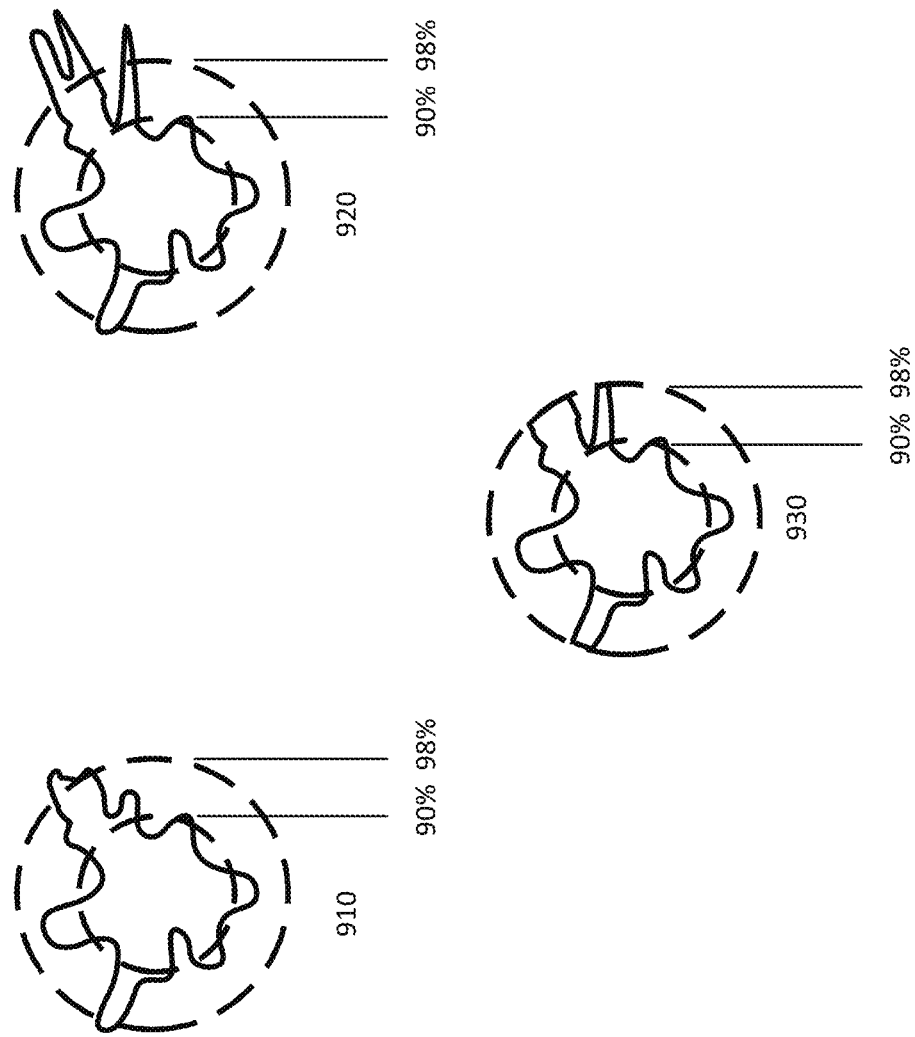
FIG. 9 illustrates an application of a cyber threat defense system using advanced machine learning to detect anomalous behavior, in accordance with an embodiment of the disclosure.

FIG. 9 illustrates an application of a cyber threat defense system using advanced machine learning to detect anomalous behavior. A normal pattern of behavior 910 may describe a set of user or device behavior within a threshold level of occurrence, such as a 98% probability of occurrence based on prior behavior. An anomalous activity 920 may describe a set of user or device behavior that is above the threshold level of occurrence. The cyber threat defense system can initiate an autonomous response 930 to counteract the anomalous activity, leaving the normal behavior unaffected.

Machine learning can approximate some human capabilities to machines. Machine learning can approximate thought by using past information and insights to form judgments. Machine learning can act in real time so that the system processes information as it goes. Machine learning can self-improve by constantly challenging and adapting the model's machine learning understanding based on new information.

New unsupervised machine learning therefore allows computers to recognize evolving threats, without prior warning or supervision.

Unsupervised Machine Learning

Unsupervised learning works things out without pre-defined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g., a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured 1/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product.

For the computer program product, a transitory computer readable medium may include radio or other carrier waves.

An apparatus such as a computer may be configured in accordance with such code to perform one or more processes in accordance with the various methods discussed herein.

Computing Systems

A computing system may be, wholly or partially, part of one or more of the server or client computing devices in accordance with some embodiments. Components of the computing system may include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media may be any available media that may be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which may be used to store the desired information, and which may be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM may include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, aa microphone, a pointing device and/or scrolling input component, such as a mouse, trackball or touch pad. The microphone may cooperate with speech recognition software. These and other input devices are often connected to the processing unit through a user input interface that is coupled to the system bus, but may be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system may operate in a networked environment using logical connections to one or more remote computers/client devices, such as a remote computing system. The logical connections may include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design may be carried out on a single computing system and/or on a distributed system in which different portions of the present design are carried out on different parts of the distributed computing system.

Note, an application described herein includes but is not limited to software applications, mobile apps, and programs that are part of an OS. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as Python, C, C++, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components may be duplicated by software emulation. Thus, a software program written to accomplish those same functions may emulate the functionality of the hardware components in input-output circuitry. A module may be implemented with electronic hardware, software stored in a memory, and/or a combination of both to perform its functions as discussed herein.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An endpoint agent configured to detect a cyber threat on an endpoint computing device including at least a processor, the endpoint agent comprising:
a communication module configured, upon execution by the processor, to facilitate bi-directional communication between a user interface and a cyber security appliance, the communication module including a user interaction module configured to communicate with the user interface and a helper module configured to communicate with the cyber security appliance;
wherein the helper module is configured to generate an icon on a display of the endpoint computing device that, when selected, enables an end user to initiate a cyber threat analysis on content within a specific electronic mail (email) message, including a uniform resource locator (URL) or other types of link within the email message, for determining whether the content is malicious, wherein the helper module comprises at least a user validation module configured to retrieve contextual information about the end user and issue authentication data to the end user using the contextual information, and
wherein the endpoint agent being configured to enable the bi-directional communication between the user interface and the cyber security appliance on receiving a query associated with identified unusual behavior.

2. The endpoint agent of claim 1 wherein the endpoint agent is configured to enable (i) the end user of the endpoint computing device to initiate the query or (ii) the cyber security appliance to initiate the query.

3. The endpoint agent of claim 1 wherein the helper module further comprises at least (i) an endpoint query builder module configured to transform the query for receipt by an application programming interface (API) that interfaces with the cyber security appliance, and (ii) a parser module configured to separate the URL or the other types of link within the email message into a plurality of URL components in human- or machine-readable format.

4. The endpoint agent of claim 1 wherein the endpoint agent is configured to enable the cyber security appliance to initiate the query based on information associated with another user or internet link identified by the end user, or based on information associated with unusual behavior on the endpoint computing device identified by the cyber security appliance.

5. The endpoint agent of claim 1 wherein the endpoint agent is configured to obtain, from the end user of the endpoint computing device, contextual information relating to the identified unusual behavior on the endpoint computing device.

6. The endpoint agent of claim 1 wherein the communication module comprises a cyber security appliance query builder module configured to provide the query to the cyber security appliance.

7. The endpoint agent of claim 1 wherein the communication module comprises a URL parser module configured to analyse internet links and parse those links into their constituent parts for analysis.

8. The endpoint agent of claim 1 wherein the communication module comprises a reporting module configured to enable the end user to report unusual behavior to the cyber security appliance.

9. The endpoint agent of claim 1 wherein the communication module comprises a Natural Language Processing (NLP) module configured to convert natural language into computer-readable language.

10. The endpoint agent of claim 1 wherein the communication module comprises a behavior feedback module configured to gather information associated with identified unusual behavior on the endpoint computing device.

11. The endpoint agent of claim 1 wherein the communication module cooperates with one or more classifier modules configured to categorize the identified unusual behavior as either normal or anomalous.

12. The endpoint agent of claim 11 wherein the communication module cooperates with a database configured to store information associated with identified anomalous behavior.

13. The endpoint agent of claim 12 wherein the cyber security appliance is configured to use the stored information associated with the identified unusual behavior to classify further identified unusual behaviors.

14. The endpoint agent of claim 1 wherein the communication module comprises an incident management module configured to retrieve information associated with the unusual behavior on the endpoint computing device from the cyber security application.

15. The endpoint agent of claim 1 wherein the communication module cooperates with a cyber security appliance server to exchange information relating to the identified unusual behavior on the endpoint computing device with the cyber security appliance.

16. A cyber security system comprising:
a cyber security appliance; and
a host device having a user interface and an endpoint agent for facilitating bi-directional communication between the user interface and a cyber security appliance, the endpoint agent comprising a communication module including a user interaction module configured to communicate with the user interface and a helper module configured to communicate with the cyber security appliance,
wherein the helper module is configured to generate an icon on a display of the endpoint computing device that, when selected, enables an end user to initiate a cyber threat analysis on content within a specific electronic mail (email) message, including a uniform resource locator (URL) or other types of link within the email message, for determining whether the content is malicious, wherein the helper module comprises at least a user validation module configured to retrieve contextual information about the end user and issue authentication data to the end user using the contextual information, and
wherein the endpoint agent is configured to enable the bi-directional communication between the user interface and the cyber security appliance on receiving a query associated with identified unusual behavior.

17. The cyber security system of claim 16 wherein the cyber security appliance resides on a cyber security server.

18. The cyber security system of claim 16 further comprising one or more classification modules.

19. The cyber security system of claim 16 further comprising a plurality of host devices each having a respective endpoint agent residing thereon, each of the plurality of endpoint agents configured to communicate with the same cyber security appliance.

\* \* \* \* \*